United States Patent
D'Silva et al.

(10) Patent No.: US 7,190,773 B1
(45) Date of Patent: Mar. 13, 2007

(54) DEVICE INDEPENDENT CALLER ID

(75) Inventors: Alin D'Silva, Waltham, MA (US); Robert A. Chingon, Honolulu, HI (US); Gerald Y. Honma, Aiea, HI (US); Ravi Narayan, Honolulu, HI (US); Mahesh Rajagopalan, Irving, TX (US); Kevin Trottier, Dallas, TX (US); Anirudha Joshi, Clearwater, FL (US)

(73) Assignee: Verizon Data Services Inc., Temple Terrace, FL (US)

( * ) Notice: Subject to any disclaimer, the term of this patent is extended or adjusted under 35 U.S.C. 154(b) by 274 days.

(21) Appl. No.: 10/083,884

(22) Filed: Feb. 27, 2002

Related U.S. Application Data

(60) Provisional application No. 60/272,122, filed on Feb. 27, 2001, provisional application No. 60/272,167, filed on Feb. 27, 2001, provisional application No. 60/275,667, filed on Mar. 13, 2001, provisional application No. 60/275,719, filed on Mar. 13, 2001, provisional application No. 60/275,020, filed on Mar. 13, 2001, provisional application No. 60/275,031, filed on Mar. 13, 2001, provisional application No. 60/276,505, filed on Mar. 19, 2001.

(51) Int. Cl.
*H04M 1/56* (2006.01)
*H04M 15/06* (2006.01)

(52) U.S. Cl. .................. 379/142.06; 379/142.08; 379/142.15; 379/142.17; 379/93.23

(58) Field of Classification Search .......... 379/142.01, 379/142.17, 142.06, 142.15, 142.14, 142.07, 379/142.08, 93.23; 370/352
See application file for complete search history.

(56) References Cited

U.S. PATENT DOCUMENTS

| | | | |
|---|---|---|---|
| 4,540,850 A | 9/1985 | Herr et al. | |
| 5,327,486 A | 7/1994 | Wolff et al. | |
| 5,440,624 A | 8/1995 | Schoof | |
| 5,631,904 A | 5/1997 | Fitser et al. | |
| 5,652,789 A | 7/1997 | Miner et al. | |
| 5,724,412 A | 3/1998 | Srinivasan | |

(Continued)

FOREIGN PATENT DOCUMENTS

EP   0818908 A3   1/1998

(Continued)

OTHER PUBLICATIONS

U.S. Appl. No. 09/828,679, filed Apr. 6, 2001, Craig Reding et al.

(Continued)

*Primary Examiner*—Barry Taylor
(74) *Attorney, Agent, or Firm*—Leonard C. Suchtya, Esq.; Joseph R. Palmieri, Esq.

(57) ABSTRACT

Methods and systems are disclosed for supplying calling party information to a called party via a network comprising a telephone network, a data network, and at least one gateway device. The gateway device is connected to both the telephone network and the data network. The gateway device receives, via the telephone network, signaling information representing a telephone call from the calling party to the called party. The signaling information includes called party information. Calling party information is obtained based on the signaling information. The calling party information is provided to the called party via the data network.

26 Claims, 19 Drawing Sheets

U.S. PATENT DOCUMENTS

| | | | |
|---|---|---|---|
| 5,872,841 | A | 2/1999 | King et al. |
| 5,875,242 | A | 2/1999 | Glaser et al. |
| 5,903,845 | A | 5/1999 | Buhrmann et al. |
| 5,907,547 | A | 5/1999 | Foladare et al. |
| 6,192,123 | B1 | 2/2001 | Grunsted et al. |
| 6,219,413 | B1 * | 4/2001 | Burg ............... 379/215.01 |
| 6,226,374 | B1 | 5/2001 | Howell et al. |
| 6,240,449 | B1 * | 5/2001 | Nadeau .............. 709/223 |
| 6,301,609 | B1 | 10/2001 | Aravamudan et al. |
| 6,310,947 | B1 | 10/2001 | Polcyn |
| 6,351,279 | B1 | 2/2002 | Sawyer |
| 6,371,484 | B1 | 4/2002 | Yuan |
| 6,411,605 | B1 | 6/2002 | Vance et al. |
| 6,430,289 | B1 | 8/2002 | Liffick |
| 6,442,245 | B1 * | 8/2002 | Castagna et al. ........ 379/88.12 |
| 6,459,780 | B1 | 10/2002 | Wurster et al. |
| 6,463,145 | B1 | 10/2002 | O'Neal et al. |
| 6,470,079 | B1 | 10/2002 | Benson |
| 6,477,374 | B1 | 11/2002 | Shaffer et al. |
| 6,480,830 | B1 | 11/2002 | Ford et al. |
| 6,519,326 | B1 * | 2/2003 | Milewski et al. .......... 379/67.1 |
| 6,535,596 | B1 | 3/2003 | Frey et al. |
| 6,546,005 | B1 | 4/2003 | Berkley et al. |
| 6,563,914 | B2 | 5/2003 | Sammon et al. |
| 6,564,261 | B1 | 5/2003 | Gudjonsson et al. |
| 6,577,622 | B1 | 6/2003 | Schuster et al. |
| 6,584,122 | B1 | 6/2003 | Matthews et al. |
| 6,614,786 | B1 | 9/2003 | Byers |
| 6,625,258 | B1 | 9/2003 | Ram et al. |
| 6,665,388 | B2 * | 12/2003 | Bedingfield ............ 379/142.01 |
| 6,717,938 | B1 | 4/2004 | D'Angelo |
| 6,735,292 | B1 | 5/2004 | Johnson |
| 6,771,949 | B1 | 8/2004 | Corliss |
| 2001/0003202 | A1 | 6/2001 | Mache et al. |
| 2001/0014863 | A1 | 8/2001 | Williams, III |
| 2002/0012425 | A1 | 1/2002 | Brisebois et al. |
| 2002/0055351 | A1 | 5/2002 | Elsey et al. |
| 2002/0076026 | A1 | 6/2002 | Batten |
| 2002/0076027 | A1 | 6/2002 | Bemnan et al. |
| 2002/0077082 | A1 | 6/2002 | Cruickshank |
| 2002/0080942 | A1 * | 6/2002 | Clapper ................. 379/201.01 |
| 2002/0083462 | A1 | 6/2002 | Arnott |
| 2002/0110121 | A1 * | 8/2002 | Mishra ...................... 370/389 |
| 2002/0147777 | A1 | 10/2002 | Hackbarth et al. |
| 2002/0147811 | A1 * | 10/2002 | Schwartz et al. ........... 709/225 |
| 2003/0014488 | A1 | 1/2003 | Dalal et al. |
| 2003/0058838 | A1 * | 3/2003 | Wengrovitz ................. 370/352 |
| 2003/0147518 | A1 * | 8/2003 | Albal et al. ............ 379/207.15 |
| 2003/0169330 | A1 | 9/2003 | Ben-Shachar et al. |
| 2004/0019638 | A1 * | 1/2004 | Makagon et al. ........... 709/204 |
| 2004/0034700 | A1 | 2/2004 | Polcyn |
| 2004/0044658 | A1 | 3/2004 | Crabtree et al. |
| 2004/0249884 | A1 | 12/2004 | Caspi et al. |

FOREIGN PATENT DOCUMENTS

| | | |
|---|---|---|
| JP | 59-169264 | 9/1984 |
| JP | 2000-270307 | 9/2000 |
| WO | WO 01/11586 A1 | 2/2001 |

OTHER PUBLICATIONS

U.S. Appl. No. 09/785,223, filed Feb. 16, 2001, Loren Swingle et al.

A. Brusilovsky, E. Gausmann, V. Gurbani, A. Jain. Lucent Technologies, A Proposal for Internet Call Waiting Service using SIP, PINT Working Group, Internet Draft, Jan. 1999, 12 Pages.

"MP3 Recorder Download—MP3 Recorder—Record Audio Stream to MP3 or WAV," 2002, http://www.mp3-recorder.net.

"FAQ Premium Home Answer" eVoice, http://content.evoice.com/wcs/signUp/FAQ_premHA_s01.htm.

"Voice-ASP, White Paper Technology & Processes," eVoice, Dec. 13, 2000.

"Voice-ASP, White Paper: Market Opportunities for Enhanced Voicemail," eVoice, Nov. 10, 2000.

"Audio Digitizing Process," TalkBank, http://www.talkbank.org/da/audiodig.html.

"Supplemental Report to Diary 53, Networking the Sound Digitizing Device," Old Colorado City Communications and the National Science Foundation Wireless Field Tests, Oct. 20, 2002, Lansing, Michigan, http://wireless.oldcolo.com/biology/ProgressReports2002/Progress%20Reports2002/53SupplementalReport(10-20-02).htm.

"Macromedia SoundEdit 16 Support Center-Working with Other Programs, What is Shockwave Audio Streaming?" http://www.macromedia.com/support/soundedit/how/shock/whatis.html.

"Chapter 3: Overview," last updated Dec. 2, 1999, http://service.real.com/help/library/guides/q270/htmfiles/overview.htm.

"How Internet Radio Works," Howstuffworks, http://computer.howstuffworks.com/internet-radio.htm/printable.

"Telecommunications and Personal Management Services Linked in Collaboration by Verizon and Microsoft," Oct. 23, 2001, http://www.microsoft.com/presspass/press/2001/oct01/10-23MSVerizonPr.asp.

"Real-Time Collaboration Integration in the Portal," T. Odenwald, SAP Design Guild, http://www.sapdesignguild.org/editions/edition5/synch_collab.asp.

"NetMeeting101," http://www.meetingbywire.com/NetMeeting101.htm.

"NetMeeting102," http://www.meetingbywire.com/NetMeeting102.htm.

"Instructions on Application Sharing and Data Collaboration," VCON Escort and Cruiser, http://www.vide.gatech.edu/docs/share/.

"Instructions on Multipoint Application Sharing and Data Collaboration," VCON Escort and Cruiser with the RadVision MCU, http://www.vide.gatech.edu/docs/multi-share/.

"File Transfer," Microsoft Windows Technologies Windows NetMeeting, last updated Jun. 4, 1999, http://www.microsoft.com/windows/netmeeting/features/files/default.asp.

"From Dial Tone to Media Tone," Analyst: R. Mahowald, IDC, Jun. 2002.

"MediaTone—The 'Dial Tone' for Web Communications Services," Webex, 2003.

Business Solutions/Professional, http://www.accessline.com/business_sol/bs_professional_body.html.

"Accessline Comms' Accessline Service, The One-Number Wonder," CommWeb. T. Kramer, Feb. 1, 2000, http://www.cconvergence.com/article/TCM20000504S0014.

"InteleScreener," 2003, http://www.intelescreener.com/howitworks.html.

"TeleZapper from Privacy Technologies," Privacy Corps—Our Review, 2002, http://www.privacycorps.com/pages/product1.htm.

"A Proposal for Internet Call Waiting Service Using SIP," A. Brusilovsky et al., Lucent Technologies, PINT Working Group, Internet Draft, Jan. 1999.

"A Model for Presence and Instant Messaging," M. Day et al., Fujitsu, Feb. 2000, Network Working Group, Request for Comments 2778.

Data Connection, Strategic Computer Technology, MeetingServer, "Broadband for Learning Case Study," Data Connection Ltd, 1998-2004, http://www.dataconnection.com/conferencing/meetingserver_casestudy.htm.

Data Connection, MainNGen, "Next Generation Messaging for Service Providers," Data Connection Limited, 2003-4.

Data Connection, Strategic Computer Technology, "Directories Explained," Data Connection Ltd, 1998-2004, http://www.dataconnection.com/inetapps/direxpl.htm.

Data Connection, Strategic Computer Technology, Directory Systems, "Directories and Meta-Directories," Data Connection Ltd, 1998-2004, http://www.dataconnection.com/inetapps/directory.htm.

Data Connection, Strategic Computer Technology, "DC-IMS\Voice Unified Messaging Gateway," Data Connection Ltd, 1998-2000, http://web.archive.org/web/20010307174512/www.dataconnection.com/messging/spivoice.htm.

Data Connection, Strategic Software Technology, "DC-SurroundSuite for Service Providers," Data Connection Ltd, 1998-2000, http://web.archive.org/web/20000914200355/www.dataconnection.com/messging/spssuite.htm.

Data Connection, Strategic Computer Technology, "Messaging Software Products and Services," Data Connection Ltd, 1998-2000, http://web.archive.org/web/20000819063320/www.dataconnection.com/messging/messgidx.htm.

Data Connection, Strategic Software Technology, "DC-Share for UNIX," Data Connection Ltd, 1998-2000, http://web.archive.org/web/20000914200713/www.dataconnection.com/conf/DCshare.htm.

Data Connection, Strategic Software Technology, "DC-H.323," Data Connection Ltd, 1998-2000, http://web.archive.org/web/20001120050600/www.dataconnection.com/conf/h323.htm.

Data Connection, Strategic Software Technology, "DC-WebShare," Data Connection Ltd, 1998-2000, http://web.archive.org/web/20001016115016/www.dataconnection.com/conf/webshare.htm.

Data Connection, Strategic Computer Technology, "DC-Recorder," Data Connection Ltd, 1998-2000, http://web.archive.org/web20001016055611/www.dataconnection.com/conf/recorder.htm.

Data Connection, Strategic Software Technology, "DC-MeetingServer," Data Connection Ltd, 1998-2000, http://web.archive.org/web/20000914200719/www.dataconnection.com/conf/meetingserver.htm.

Data Connection, Strategic Computer Technology, "DC-MeetingServer," Data Connection Ltd, 1998-2000, http://web.archive.org/web/20021201144529/www.dataconnection.com/inetapps/conferencing.htm.

Data Connection, Strategic Software Technology, "DC-VoiceNet Features," Data Connection Ltd, 1998-2000, http://web.archive.org/web/20001016102614/www.dataconnection.com/messging/vnfeat.htm.

Data Connection, Strategic Software Technology, "DC-VoiceNet," Data Connection Ltd, 1998-2000, http://web.archive.org/web/20000914200424/www.dataconnection.com/messging/vnet.htm.

Data Connection, Strategic Computer Technology, "Messaging Software Products and Services," Data Connection Ltd, 1998-2000, http://web.archive.org/web/20010305143803/www.dataconnection.com/messging/messgidx.htm.

Data Connection, Strategic Computer Technology, "DC-SurroundSuite for Enterprises," Data Connection Ltd, 1998-2000, http://web.archive.org/web/20010306082711/www.dataconnection.com/messging/enssuite.htm.

Data Connection, "SmartDialer Functional Overview," Version v1,0, Internet Applications Group, Data Connection Ltd., Nov. 3, 2003.

Data Connection, "SIP Market Overview, An analysis of SIP technology and the state of the SIP Market," Jonathan Cumming, Data Connection Ltd., 2003-2004.

Data Connection, "Integrating Voicemail Systems, A white paper describing the integration of heterogeneous voicemail systems," Michael James, Internet Applications Group, Data Connection Ltd., 2004.

Data Connection, Strategic Computer Technology, "MailNGen: Next generation messaging for Servie Providers," Data Connection Ltd, 1998-2004, http://www.dataconnection.com/messaging/.

Data Connection, Strategic Computer Technology, "MailNGen: Unified Messaging," Data Connection Ltd, 1998-2004, http://www.dataconnection.com/messaging/unified_messaging.htm.

Data Connection, Strategic Computer Technology, "MeetingServer: The award-winning web conferencing solution for Service Providers," Data Connection Ltd, 1998-2005, http://www.dataconnection.com/conferencing/.

Data Connection, Strategic Computer Technology, "MeetingServer: The web conferencing solution for Service Providers," Data Connection Ltd, 1998-2004, http://www.dataconnection.com/conferencing/meetingserver.htm.

Data Connection, Strategic Computer Technology, "MeetingServer: Web conferencing architecture," Data Connection Ltd, 1998-2004, http://www.dataconnection.com/conferencing/meetingserver_arch.htm.

* cited by examiner

| Time 520 | Date 522 | Caller ID 524 |
|---|---|---|
| 10:55 PM | 02.09.01 | Brian Roberts |
| 09:32 AM | 02.15.01 | John Smith |
| | | |

DEVICE INDEPENDENT CALLER ID

RELATED APPLICATIONS

Applicants claim the right to priority under 35 U.S.C, § 119(e) based on Provisional Patent Application No. 60/272,122, entitled "VOICE MAIL INTEGRATION WITH INSTANT MESSENGER," filed Feb. 27, 2001; Provisional Patent Application No. 60/272,167, entitled "DEVICE INDEPENDENT CALLER ID," filed Feb. 27, 2001; Provisional Patent Application No. 60/275,667, entitled "CALENDAR CALLING AGENT," filed Mar. 13, 2001; Provisional Patent Application No. 60/275,719, entitled "CALENDAR CALLING AGENT," filed Mar. 13, 2001; Provisional Patent Application No. 60/275,020, entitled "METHOD AND APPARATUS FOR INTEGRATED BILLING VIA PDA," filed Mar. 13, 2001; Provisional Patent Application No. 60/275,031, entitled "METHOD AND APPARATUS FOR UNIFIED COMMUNICATIONS MANAGER VIA INSTANT MESSAGING," filed Mar. 13, 2001; and Provisional Patent Application No. 60/276,505, entitled "METHOD AND APPARATUS FOR CONTEXT BASED QUERYING," filed Mar. 19, 2001, and all of which are expressly incorporated herein by reference in their entirety.

The present application also relates to U.S. patent application Ser. No. 10/083,792, entitled "VOICE MAIL INTEGRATION WITH INSTANT MESSENGER"; U.S. patent application Ser. No. 10/083,822, entitled "METHOD AND APPARATUS FOR A UNIFIED COMMUNICATION MANAGEMENT VIA INSTANT MESSAGING"; U.S. patent application Ser. No. 10/084,390, entitled "METHOD AND APPARATUS FOR CONTEXT BASED QUERYING"; U.S. patent application Ser. No. 10/083,793, entitled "METHOD AND APPARATUS FOR CALENDARED COMMUNICATIONS FLOW CONTROL"; U.S. patent application Ser. No. 10/084,121, entitled "CALENDAR-BASED CALLING AGENTS"; U.S. patent application Ser. No. 10/083,798, entitled "METHOD AND APPARATUS FOR INTEGRATED BILLING VIA PDA"; and U.S. patent application Ser. No. 10/084,002, entitled "METHOD AND APPARATUS FOR DIAL STREAM ANALYSIS", and all of which are expressly incorporated herein by reference in their entirety.

FIELD OF THE INVENTION

The present invention relates to systems and methods for controlling telephony systems using data processing systems and, more particularly, to providing information regarding the origin of telephone calls.

BACKGROUND OF THE INVENTION

Telephone service providers typically offer caller identification ("Caller-ID") as a service to report the telephone number and, optionally, a name of a calling party. Caller-ID provides the called party an opportunity to learn the identity of a calling party before answering a call. This allows a called party to screen calls from particular calling parties. Alternatively, it may alert a called party to answer the current call from a particular person. The Caller-ID service may also allow historical logging of calls. For example, a person may attempt to contact one of her friends and may not leave a voice mail message. With Caller-ID, the called friend may refer to a record of the time and telephone number of the calling friend, and may then return the call, even though the calling friend did not leave a voice mail message. Alternatively, a person may use the historical logging feature to aid in remembering when telephone calls were received or when telephone calls were accepted and the date and time of a particular call took place.

Caller-ID information is delivered to a device coupled to the Public Switched Telephone Network ("PSTN"). For example, a dedicated Caller-ID device can be connected to a PSTN line that is shared with a telephone. More complex systems, such as those deployed in business environments may use a local Private Branch Exchange ("PBX") connected to the PSTN and have Caller-ID displays integrated into the telephone units. Additionally, many wireless telephone service providers use wireless handsets which have integrated Caller-ID display functionality.

Unfortunately, the known systems are limited to delivering Caller-ID information to a specific device. For example, Caller-ID information delivered to a person's business telephone unit does not appear at that person's home. As a result, that person may not learn of a missed call until he returns home from work. Furthermore, the known systems are limited to the PSTN and are incapable of delivering Caller-ID information over a data network. Known systems do not have the ability to obtain Caller-ID information from the PSTN and provide the Caller-ID information to users via a data network, such as the Internet. For example, a person may not receive Caller-ID information at his computer, e.g., in real time.

SUMMARY OF THE INVENTION

Consistent with the principles of the present invention, calling party information is supplied to a called party over a telephone network, or a data network using at least one server connected to both the telephone network and the data network. The server receives, through the telephone network, signaling information representing a telephone call from a calling party to a called party. The signaling information comprises called party information. The server obtains the calling party information based on the signaling information, and provides the calling party information to the called party via the data network.

Consistent with the principles of the present invention, caller identification information is supplied from a calling party to a called party via a public telephone network, using a caller identification gateway by which the calling party places a telephone call by transmitting signaling information corresponding to a telephone number of the called party over the public telephone network. The server accepts the signaling information corresponding to the telephone number associated with the called party. A path through the public telephone network based on the signaling information is established. A telephone switch corresponding to a destination telephone terminal corresponding to the telephone number associated with the called party is selected. Caller identification information corresponding to the calling party is retrieved by the caller identification gateway from the telephone switch. The caller identification information is transmitted to a user service center server using an internet protocol. The caller identification information is transmitted by the user service center server to an instant messaging server over an internet protocol data network. The caller identification information to the called party is presented by displaying an instant message provided by the instant messaging server on a computer screen of a called party.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments of the invention and together with the description, serve to explain the principles of the invention.

FIGS. 3*a*–3*m* are exemplary screen shots of a user interface for caller-id notification services, in accordance with methods and apparatus consistent with the principles of the present invention;

FIG. 5 is an exemplary data structure used for providing caller identification information, in accordance with methods and apparatus consistent with the principles of the present invention;

DETAILED DESCRIPTION

Consistent with the principles of the present invention, calling party information from a telephone network, such as Caller-ID information, is provided to a called party via a data network using a unified communications service. The unified communications service receives, from the telephone network, signaling information representing a telephone call from a calling party to a called party. The unified communications service determines the calling party information based on the signaling information, and provides the calling party information to the called party via the data network.

In accordance with the principles of the present invention, information indicating a voice mail from a telephone network, is provided to a called party via a data network using a unified communications service. The unified communications service receives, from the telephone network, information representing a voice mail intended for a called party. The unified communications service then provides the voice mail information to the called party via the data network.

Reference will now be made in detail to exemplary embodiments of the present invention, examples of which are illustrated in the accompanying drawings. Wherever possible, the same reference numbers will be used throughout the drawings to refer to the same or like parts.

Figure 1:
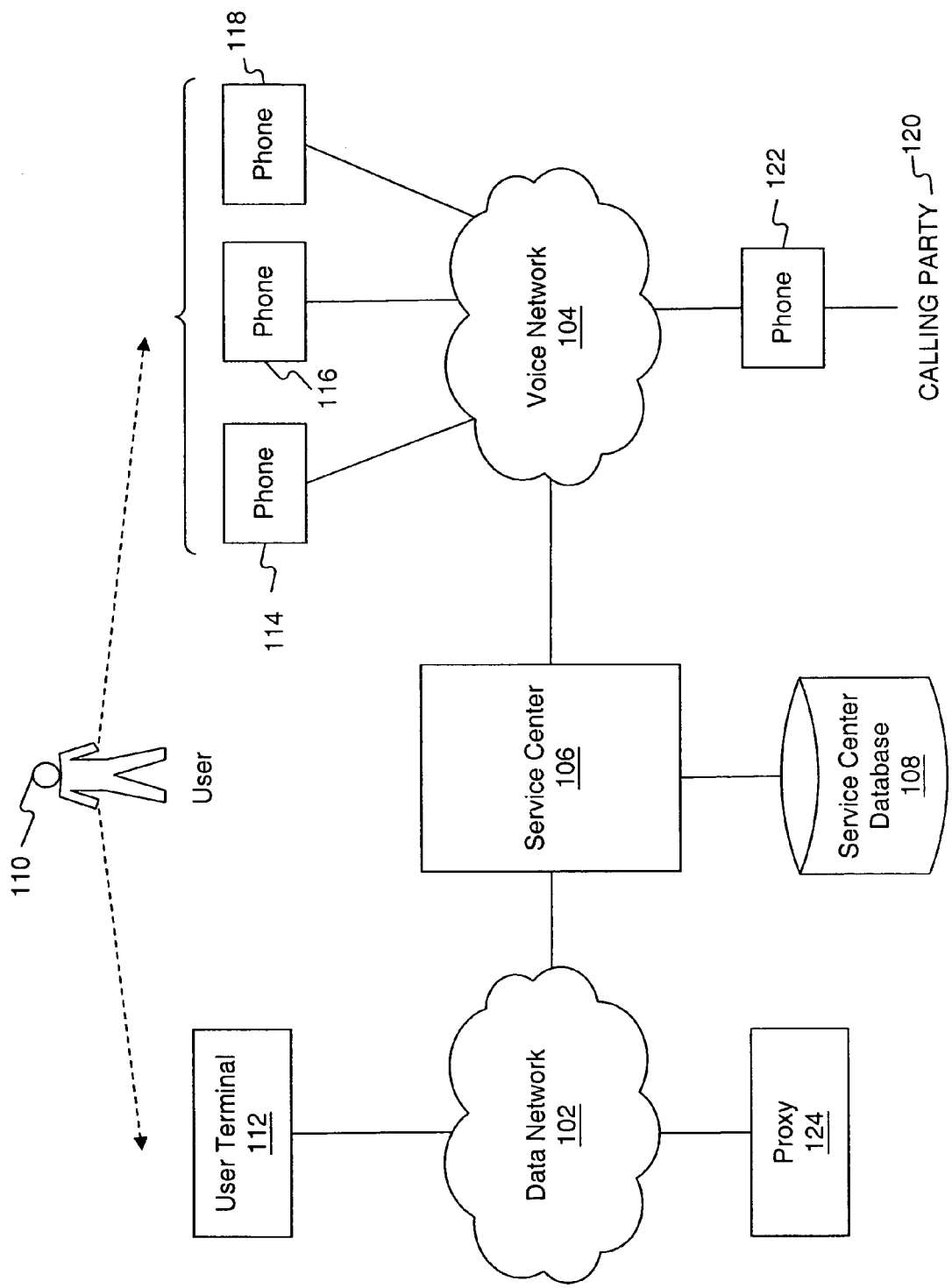
FIG. 1 is a block diagram of a data processing and telecommunications environment, in accordance with methods and apparatus consistent with the principles of the present invention.

FIG. 1 is a block diagram of a data processing and telecommunications environment, in accordance with methods and apparatus consistent with the principles of the present invention. The data processing and telecommunications environment 100 may include a data network 102, a voice network 104, a service center 106, and a service center database 108. As shown, a user 110 may use a data terminal 112 to interface data network 102. In addition, user 110 may use phones 114, 116, and 118 to interface with voice network 104. For example, calling party 120 may use phone 122 to call user 110 at any one of phones 114, 116, and 118.

Data network 102 provides communications between the various entities depicted in environment 100 of FIG. 1, such as data terminal 112 and service center 106. Data network 102 may be a shared, public, or private network and encompass a wide area or local area. For example, data network 102 may be implemented on a network, such as the Internet.

Voice network 104 provides telephony services, for example, to allow calling party 120 to place a telephone call to user 110. For example, voice network 104 may be implemented using a network, such as the Public Switched Telephone Network ("PSTN"). Alternatively, voice network 104 may be implemented using voice-over Internet Protocol ("VoIP") technology. In addition, voice network 104 may be implemented using both the PSTN and VoIP technology consistent with the principles of the present invention. Voice network 104 is described in further detail with reference to FIG. 6.

Service center 106 provides a platform for managing communications over data network 102 and voice network 104. In addition, service center 106 provides gateway functions, such as code and protocol conversions, to transfer communications between data network 102 and voice network 104. Service center 106 may be implemented using a combination of hardware and software. For example, service center 106 may be implemented using a plurality of a general purpose computers or servers coupled by a network (not shown). Although service center 106 is shown with direct connections to data network 102 and voice network 104, any number and type of network elements may be interposed between service center 106, data network 102, and voice network 104. Service center 106 is described in further detail with reference to FIG. 4.

Service center database 108 contains information regarding user 110. For example, service center database 108 may contain information including: an identifier for user 110, a password, one or more email addresses for user 110, one or more instant messaging identifiers for user 110, and one or more telephone numbers, such as for phones 114, 116, and 118. Additionally, service center database 108 may contain configuration information that indicate rules for how and when communications, such as telephone calls over voice network 104, are forwarded. Service center database 108 may be implemented as an Oracle™ database using a combination of known hardware and software, such as Proliant™ servers and EMC storage devices.

Data terminal 112 provides user 110 an interface to data network 102. For example, data terminal 112 may be implemented using any device capable of accessing the Internet, such as a general purpose computer or personal computer equipped with a modem. Data terminal 112 may also be implemented in other devices, such as the Blackberry™, and Ergo Audrey™. Furthermore, data terminal 112 may be implemented in wireless devices, such as pagers, mobile phones (with data access functions), and Personal Digital Assistants ("PDA") with network connections.

Data terminal 112 also allows user 110 to communicate with service center 106. For example, user 110 may use instant messaging ("IM") to communicate with service center 106. IM is a communications service implemented over the Transmission Control Protocol and Internet Protocol ("TCP/IP") suite to create a private communication channel. Although there is no accepted universal IM standard, an appropriate IM model may be found in RFC 2778, M. Day et al., The Internet Society (2000), titled "A Model for Presence and Instant Messaging," which describes, inter alia, a model for providing instant messaging services. There are several known IM systems including America OnLine Instant Messenger ("AIM") and Microsoft Network Messenger Service ("MSNMS"). In addition to IM services, data terminal 112 may use other aspects of TCP/IP including the hypertext transfer protocol ("HTTP"); the user datagram protocol ("UDP"); the file transfer protocol ("FTP"); the hypertext markup language ("HTML"); and the extensible markup language ("XML").

Data terminal 112 may communicate directly with service center 106. For example, a client application may be installed on data terminal 112, which directly communicates with service center 106. Alternatively, data terminal 112 may communicate with service center 106 via proxy 124. Data terminal 112 is described in further detail with reference to FIG. 2.

Proxy 124 provides an intermediate communications service for data terminal 112 and service center 106. Proxy 124 may act on behalf of user 110 to interface service center 106 and provides functions, such as authentication services, and protocol translation services. For example, user 110 may be a MSNMS subscriber and proxy 124 may be a MSNMS server. User 110 may then use MSNMS IM services to indirectly interface service center 106. As another example, proxy 124 may be a web site. User 110 may provide information, such as information for call forwarding patterns, to proxy 124 via web pages and secured using secured sockets layer ("SSL"). Proxy 124 may then establish an SSL session with service 106 and provide the information from user 110.

Phones 114, 116, 118, and 122 interface with voice network 104. Phones 114, 116, 118, and 122 may be implemented using known devices, including wireline phones and mobile phones, such as wireless phones. Although phones 114, 116, 118, and 122 are shown directly connected to voice network 104, any number of intervening elements, such as a private branch exchange ("PBX"), may be interposed between phones 114, 116, 118, and 122 and voice network 104.

Figure 2:
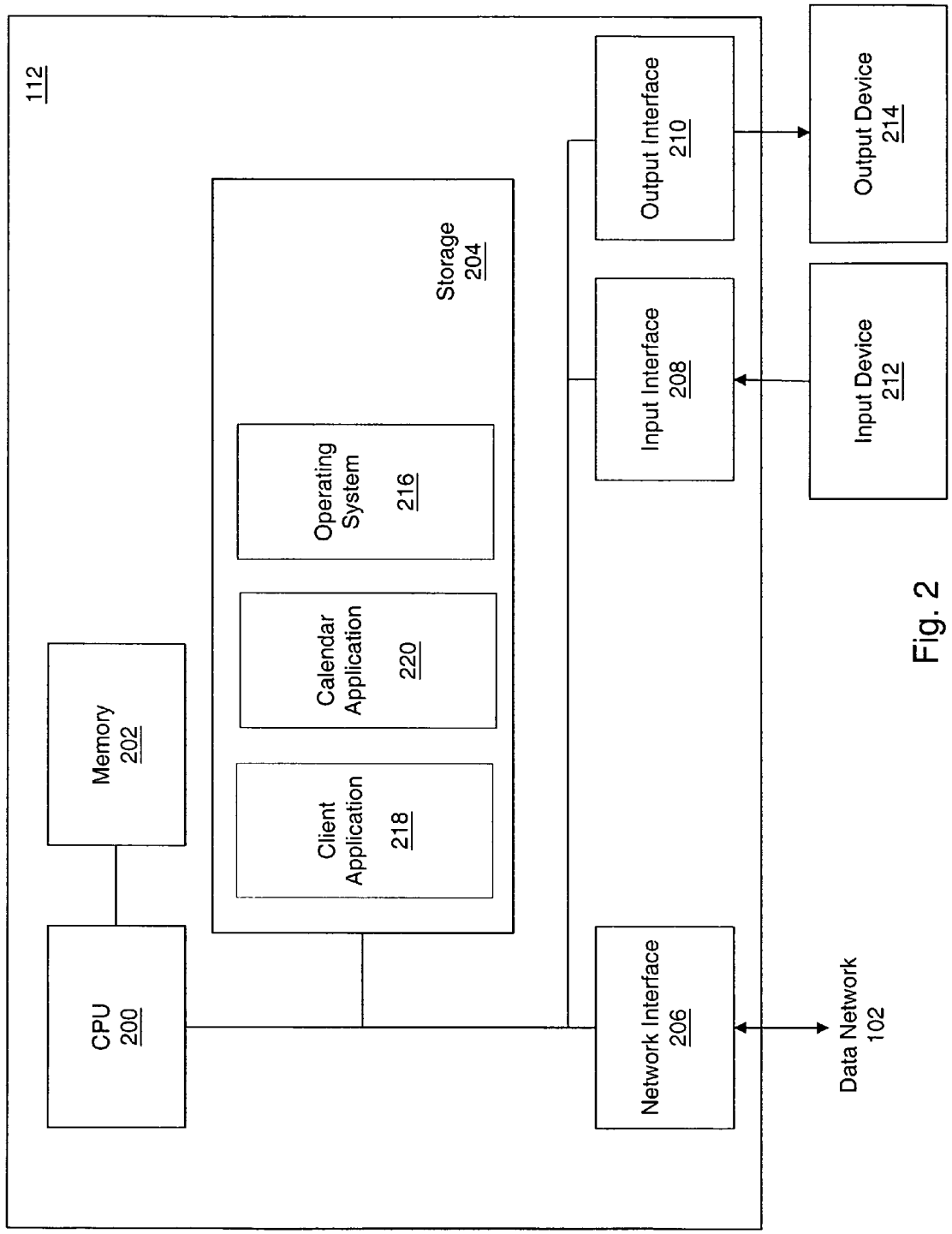
FIG. 2 is a block diagram of a data terminal, in accordance with methods and apparatus consistent with the principles of the present invention.

FIG. 2 is a block diagram of a data terminal, in accordance with methods and apparatus consistent with the principles of the present invention. As shown, data terminal 112 includes a central processing unit (CPU) 200, a memory 202, a storage module 204, a network interface 206, an input interface 208, an output interface 210, an input device 216, and an output device 218.

CPU 200 provides control and processing functions for data terminal 112. Although FIG. 2 illustrates a single CPU, data terminal 112 may include multiple CPUs. CPU 200 may also include, for example, one or more of the following: a co-processor, memory, registers, and other processing devices and systems as appropriate. For example, CPU 200 may be implemented using a Pentium™ processor provided from Intel Corporation.

Memory 202 provides a primary memory for CPU 200, such as for program code. Memory 202 may be embodied with a variety of components of subsystems, including, a random access memory ("RAM"), and a read-only memory ("ROM"). For example, when data terminal 112 executes an application installed in storage module 204, CPU 200 may download at least a portion of the program code from storage module 204 into memory 202. As CPU 200 executes the program code, CPU 200 may also retrieve additional portions of program code from storage module 204.

Storage module 204 provides mass storage for data terminal 112. Storage module 204 may be implemented with a variety of components or subsystems including, for example, a hard drive, an optical drive, a general-purpose storage device, a removable storage device, and/or other devices capable of storing information. Further, although storage module 204 is shown within data terminal 112, storage module 204 may be implemented external to data terminal 112.

Storage module 204 includes program code and information for data terminal 112 to communicate with service center 106. Storage module 204 includes program code for a calendar application 216, such as GroupWise provided by Novell Corporation, or Outlook provided by Microsoft Corporation; a client application 218, such as a MSNMS client, or AIM client; and an Operating System (OS) 216, such as the Windows Operation System provided by Microsoft Corporation. In addition, storage module 204 may include other program code and information (not shown), such as program code for TCP/IP communications; kernel and device drivers; configuration information, such as a Dynamic Host Configuration Protocol (DHCP) configuration; a web browser, such as Internet Explorer provided by Microsoft Corporation, or Netscape Navigator provided by Netscape Corporation; and any other software that may be installed on data terminal 112.

Network interface 206 provides a communications interface between data terminal 112 and data network 102. Network interface 206 may receive and transmit communications for data terminal 112. For example, network interface 206 may be a modem, or a local area network ("LAN") port.

Input interface 208 receives input from user 110 via input device 212 and provides the input to CPU 200. Input device 212 may include, for example, a keyboard, a microphone, and a mouse. Other types of input devices may also be implemented consistent with the principles of the present invention.

Output interface 210 provides information to user 110 via output device 214. Output device 214 may include, for example, a display, a printer, and a speaker. Other types of output devices may also be implemented consistent with the principles of the present invention.

Figure 3A:
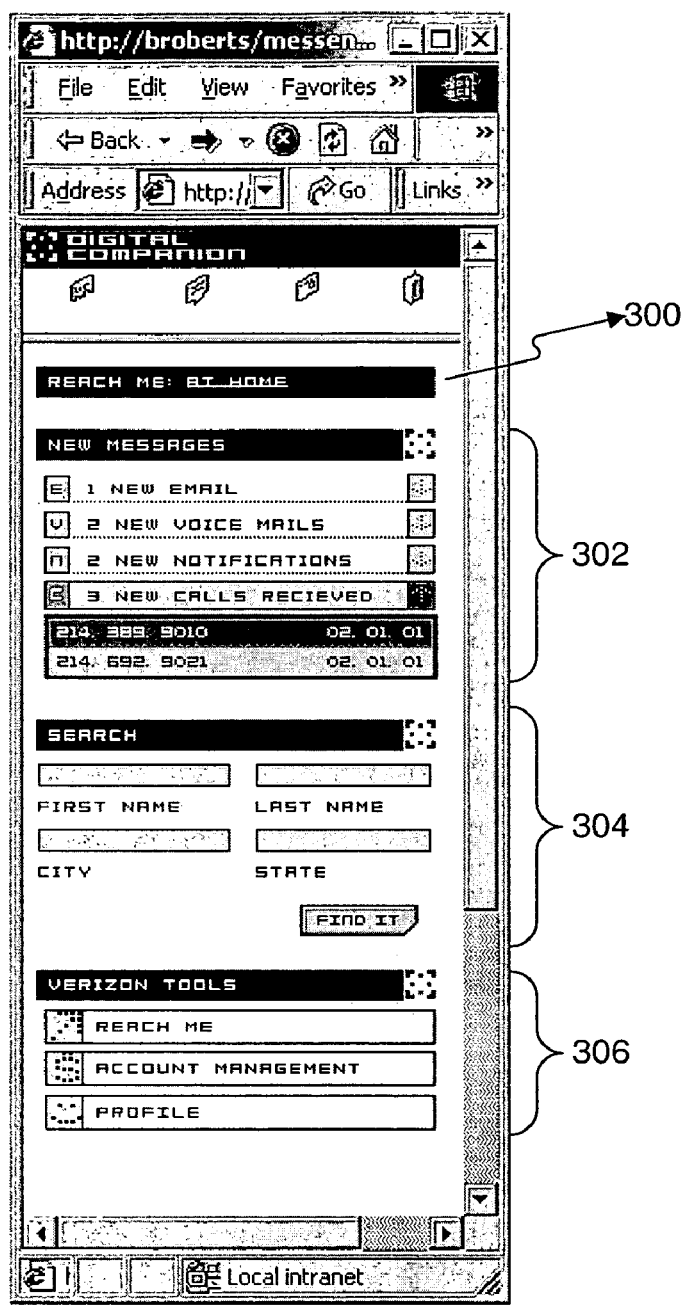

FIGS. 3a–3m illustrate exemplary screen shots of user interfaces to implement for the device independent caller ID. As shown in FIG. 3a, the screen shot provides a current location portion 300 for indicating that communications should be directed to the "AT HOME" location. Current location 300 may also indicate other locations, such as, for example, "AT WORK, "IN CAR", and "ON TRAVEL." Such locations can be based on predetermined choices or user configurable choices. The screen shot also provides a new message portion 302 that lists the number and type of new messages. In particular, new message portion 302 shows that there is "1 New EMAIL", "2 NEW VOICE MAILS", "2 NEW NOTIFICATIONS", and "3 NEW CALLS RECEIVED". New message portion 302 can also provide the last phone numbers dialed and the date they were dialed.

The screen shot also provides a search portion 304 that allows a user to search for contact information regarding a particular person. For example, search portion 304 provides "FIRST NAME", "LAST NAME", "CITY", and "STATE" search inputs to find contact information of a particular person. The screen shot also provides a tools portion 306 that gives a user options to modify various aspects of the communications service. These options may include "REACH ME", "ACCOUNT MANAGEMENT", and "PROFILE" options. The "REACH ME" option allows a user to change where a user is to be contacted shown in the current location portion 300. The "ACCOUNT MANAGEMENT" option allows a user to modify information such as billing information associated with a called party. The "PROFILE" option allows a user to modify how communications are forwarded.

Figure 3B:
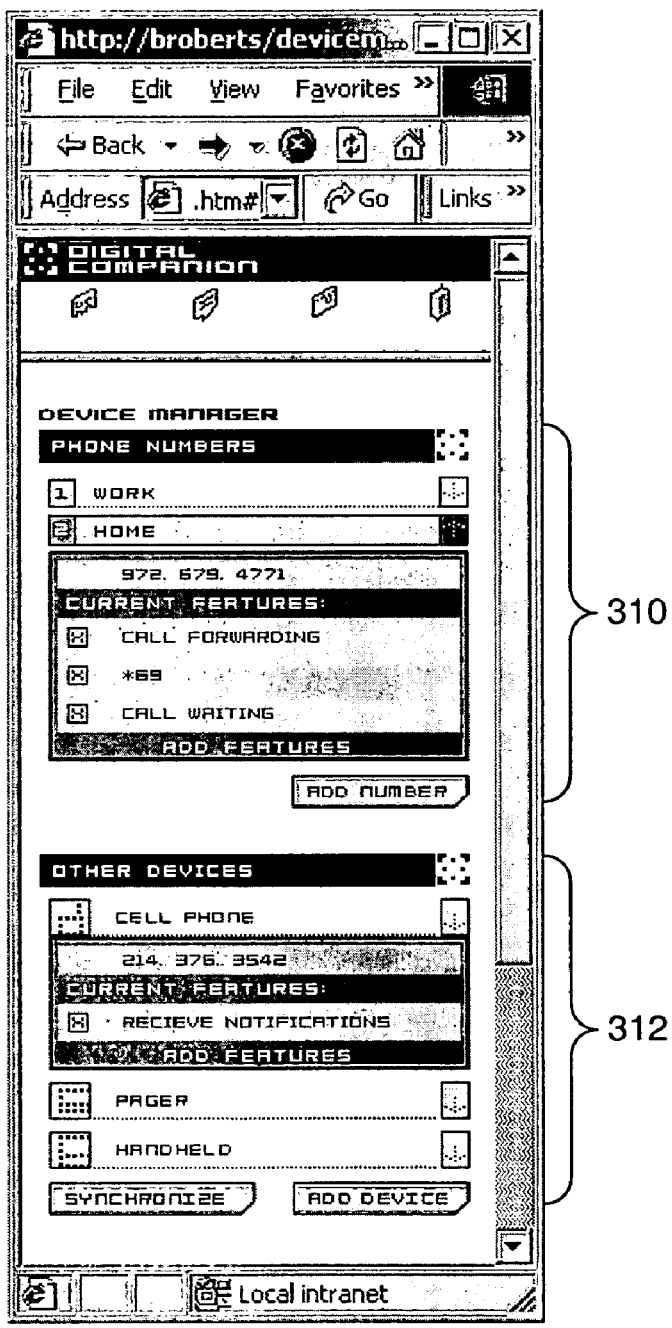

As shown in FIG. 3b, the screen shot shows a user interface for a device manager. The screen shot shows a device manager portion 310 that allows a user to view and to change phone number settings. For example, the user can change at "WORK" and at "HOME" phone number settings. Device manage portion 310 also provides a "CURRENT FEATURES" option that lists features being used. Such features include "CALL FORWARDING", "*69", and "CALL WAITING". The user also has the option to "ADD FEATURES" or "ADD NUMBERS". The screen shot also provides an other devices portion 312 that allows a user to manage devices which are not associated with a particular location. Other devices portion 310 lists "CELL PHONE", "PAGER", and "HANDHELD" devices as other devices in which a user can manage. For each device, a user can view the number for the other device and associated "CURRENT FEATURES" for the other device. Other devices portion 312 also provides a "SYNCHRONIZE" option and "ADD DEVICE" option for the user.

Figure 3C:
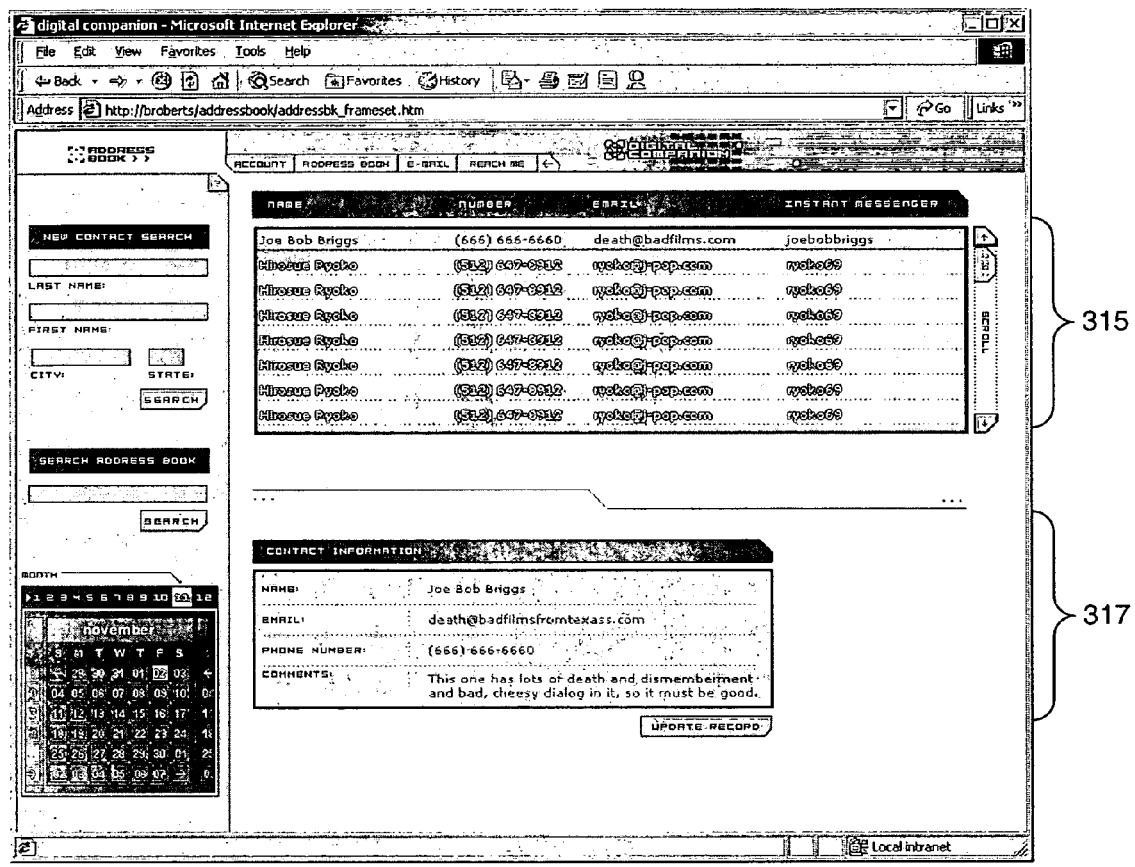

As shown in FIG. 3c, the screen shot shows a user interface for an address book. The screen shot shows an address list portion 315 that lists contact information for the user. For example, the contact information may include "NAME", "ADDRESS", "NUMBER", "EMAIL", and "INSTANT MESSENGER" information. The screen shot also shows a record information portion 317 that displays a specific record for a contact. The user has the option to "UPDATE" the record. The screen shows also provides a search window to search for contact information and a calendar.

Figure 3D:
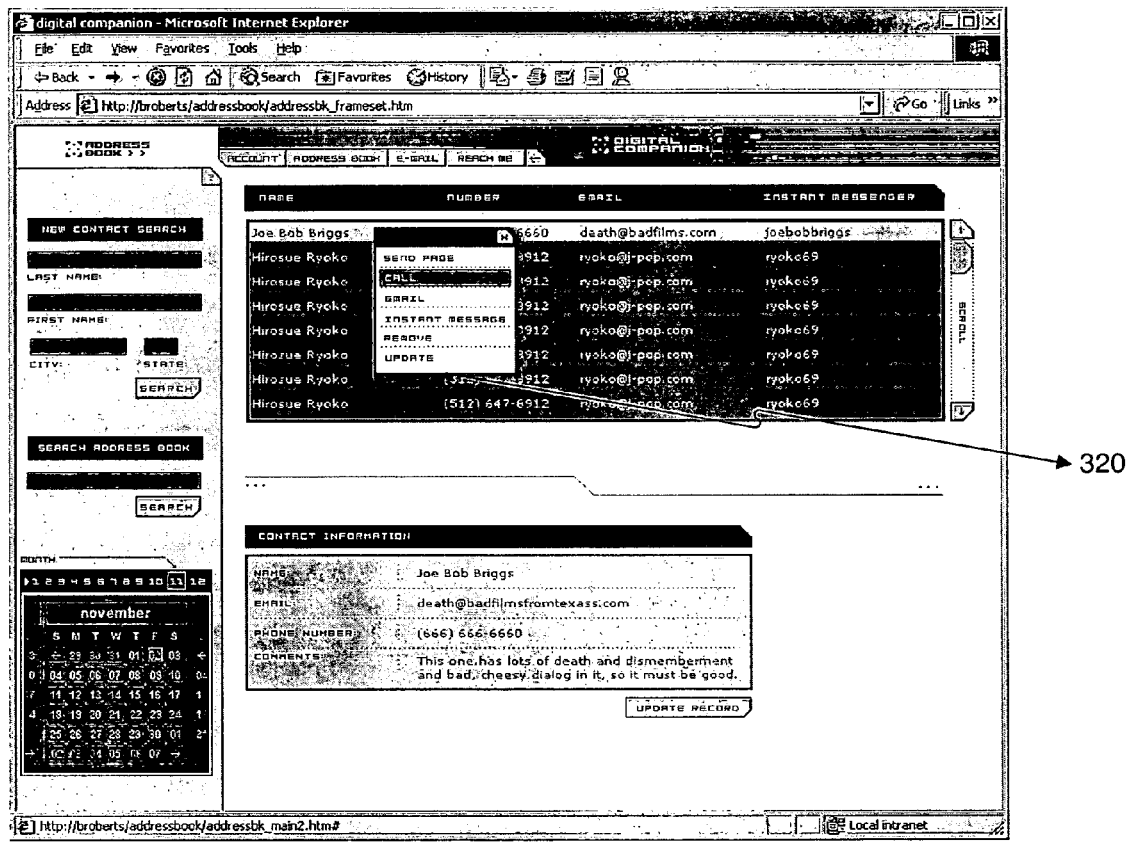

As shown in FIG. 3d, the screen shot shows the user interface of FIG. 3c with a pull-down menu 320 that provides a number of options for a user to contact a selected person consistent with the present invention. For example, the user can contact the selected person using such options as "SEND PAGE", "CALL", "EMAIL", and "INSTANT MESSAGE". Pull-down menu 320 also provides a "REMOVE" and "UPDATE" option to modify contact information in the address book.

Figure 3E:
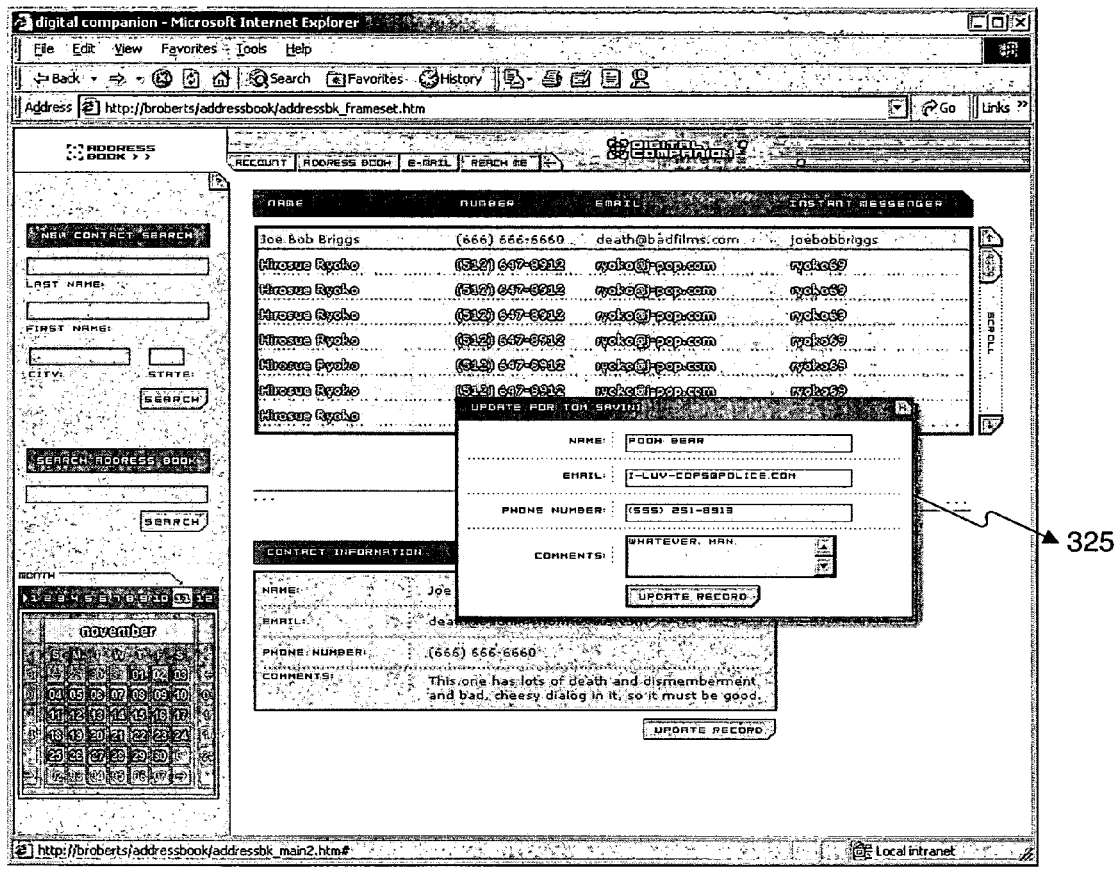

As shown in FIG. 3e, the screen shot shows the user interface of FIG. 3c with a pop-up window 325 that provides a number of inputs to modify contact information for a person in the address book. Pop-up window 325 is shown to update a record for "TOM SERVINI" using, e.g., "NAME", "EMAIL", and "PHONE NUMBER" inputs. Pop-up window 325 may also provide a "COMMENTS" window for the user to input a comment.

Figure 3F:
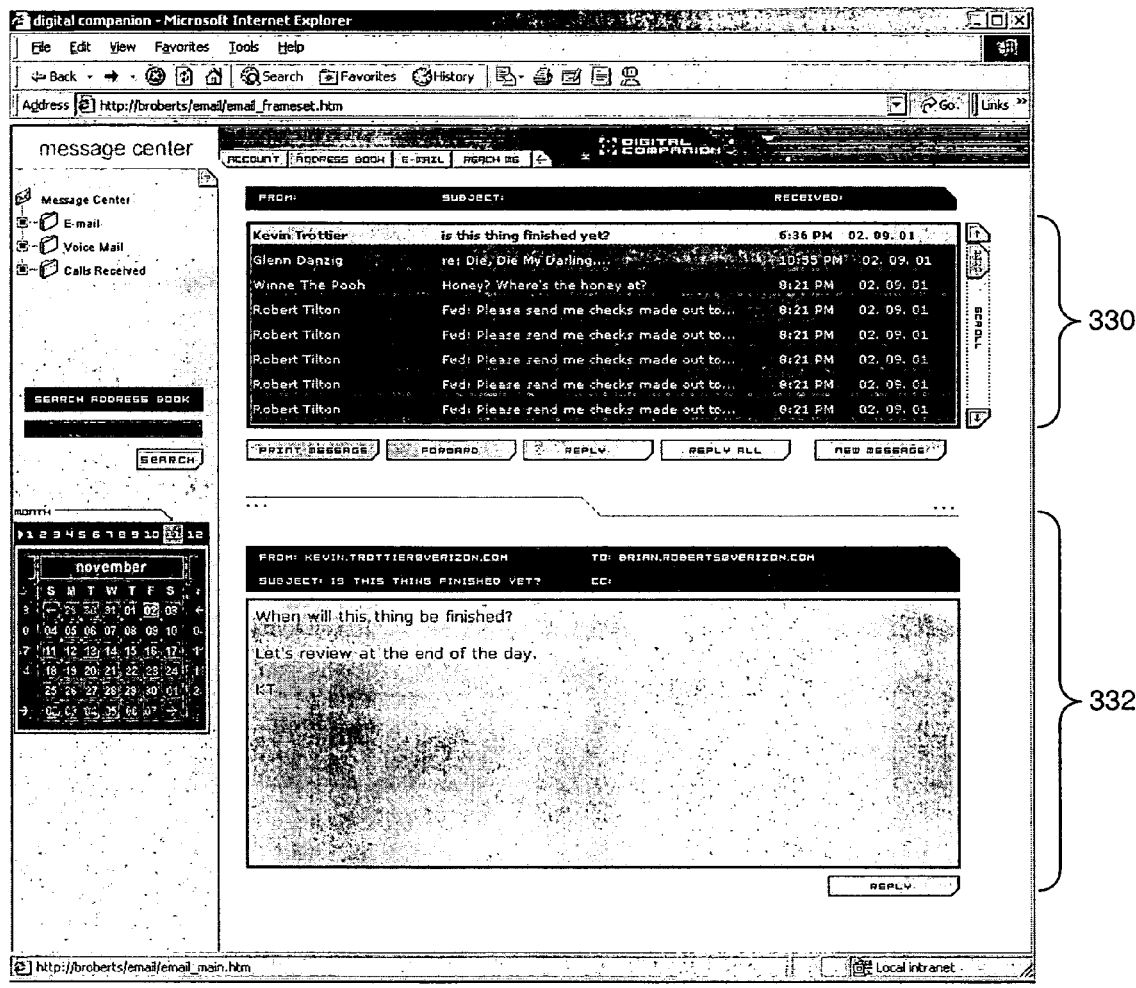

As shown in FIG. 3f, the screen shot shows a user interface for a message center panel having a summary portion 330 that lists messages received in a "RECEIVED:" column, the subject of the received messages in a "SUBJECT:" column, and the name of the persons who sent the messages in a "FROM:" column. Summary portion 330 may also provide other types of information such as the date/time the message was received, the data size of the message, or an attachment indicator. Additionally, summary portion 330 may provide a summary of recent e-mails or instant messages received by the user. Summary portion 330 also provides a number of options to process the messages. For example, the user may select a "PRINT MESSAGE", "FORWARD", "REPLY", "REPLY ALL", or "NEW MESSAGE" option for the listed messages in summary portion 330. The screen shot also shows a detail view portion 332 that provides the details of a selected message. For example, the details of an email message from "KEVIN.TROTTIER" are shown. Detail view portion 322 also provides a "REPLY" option to reply to the viewed message.

Figure 3G:
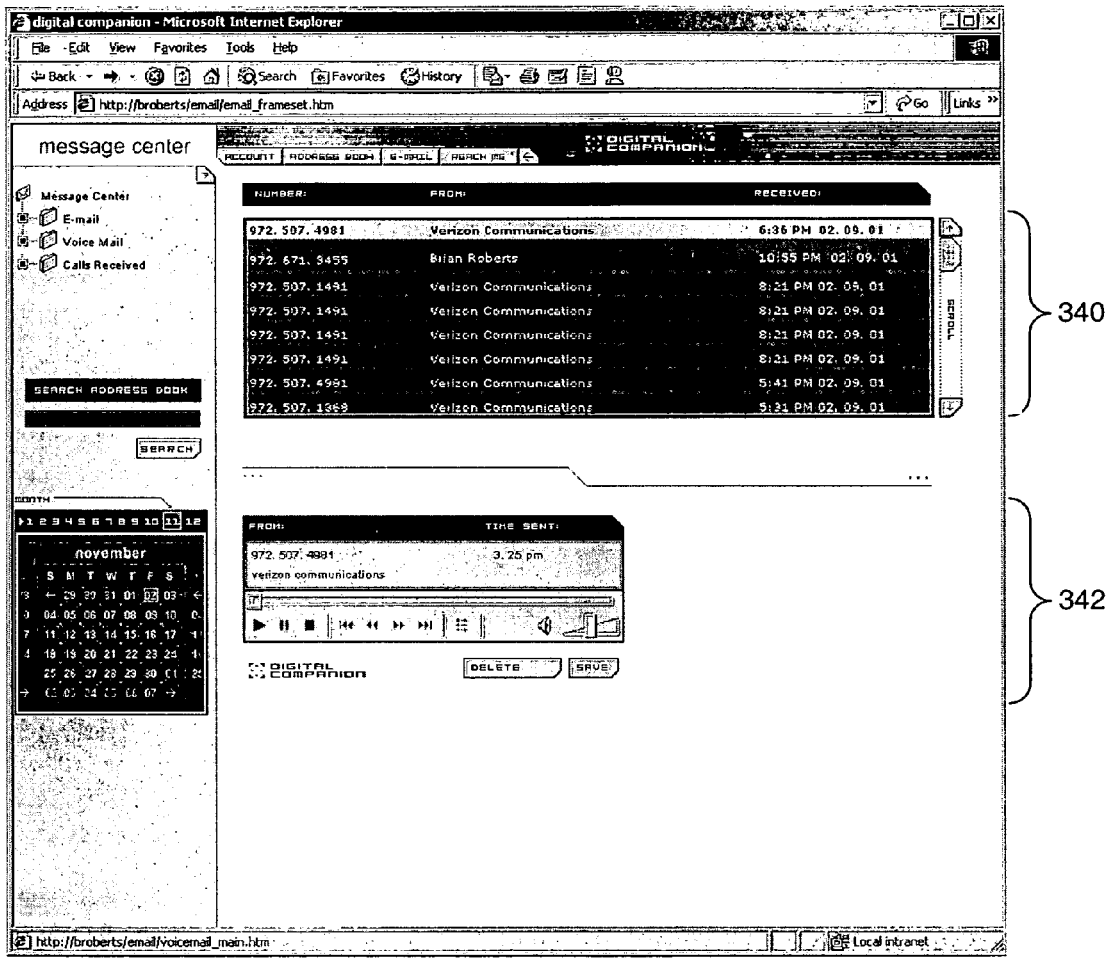

As shown in FIG. 3g, the screen shot shows a user interface for a message center panel having a summary portion 340, which is similar to summary portion 330 of FIG. 3f. Summary portion 340 provides summary information applicable to voice mails in a "NUMBER:", "FROM:" and "RECEIVED:" column. The screen shot also shows a detail portion 342 that allows a user to playback the voice message. Detail portion 342 also allows the user to "DELETE" or "SAVE" the voice message.

Figure 3H:
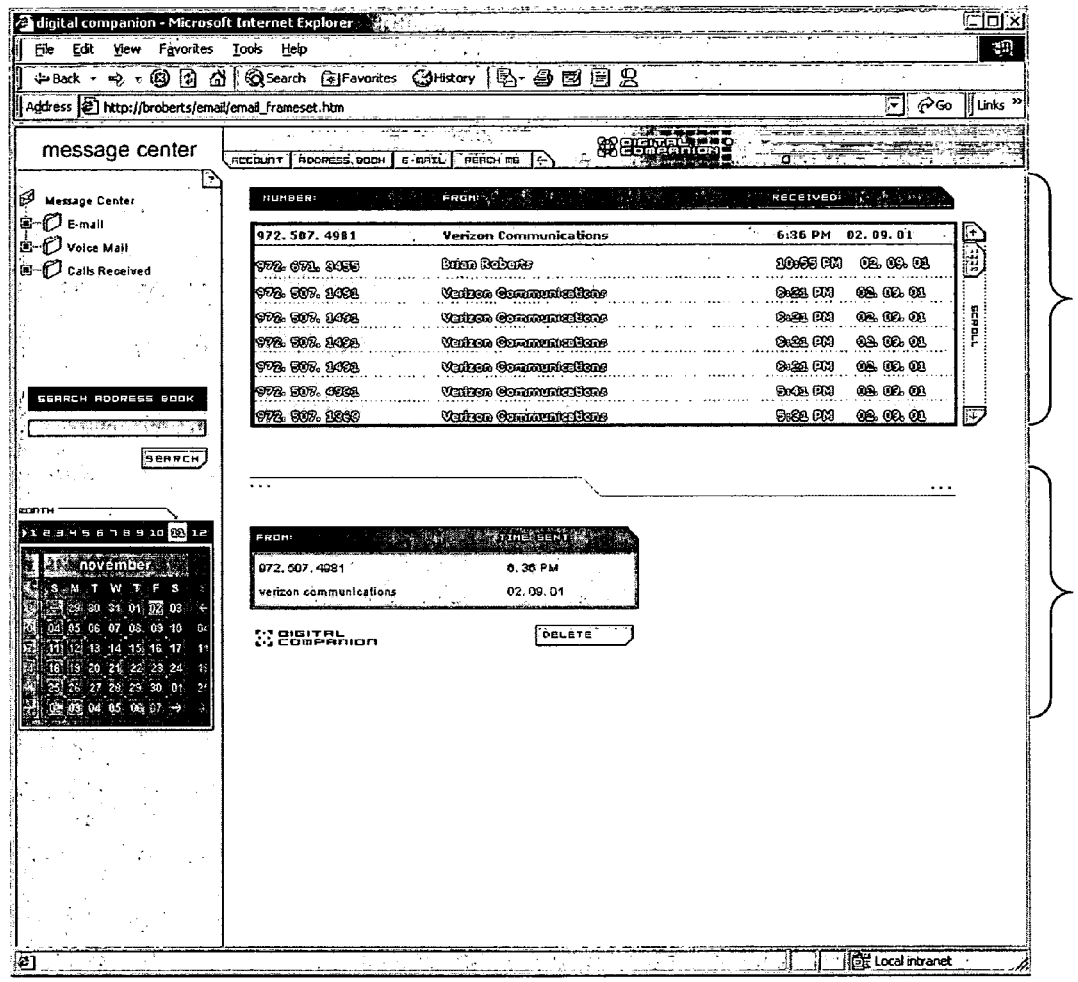
Figure 3I:
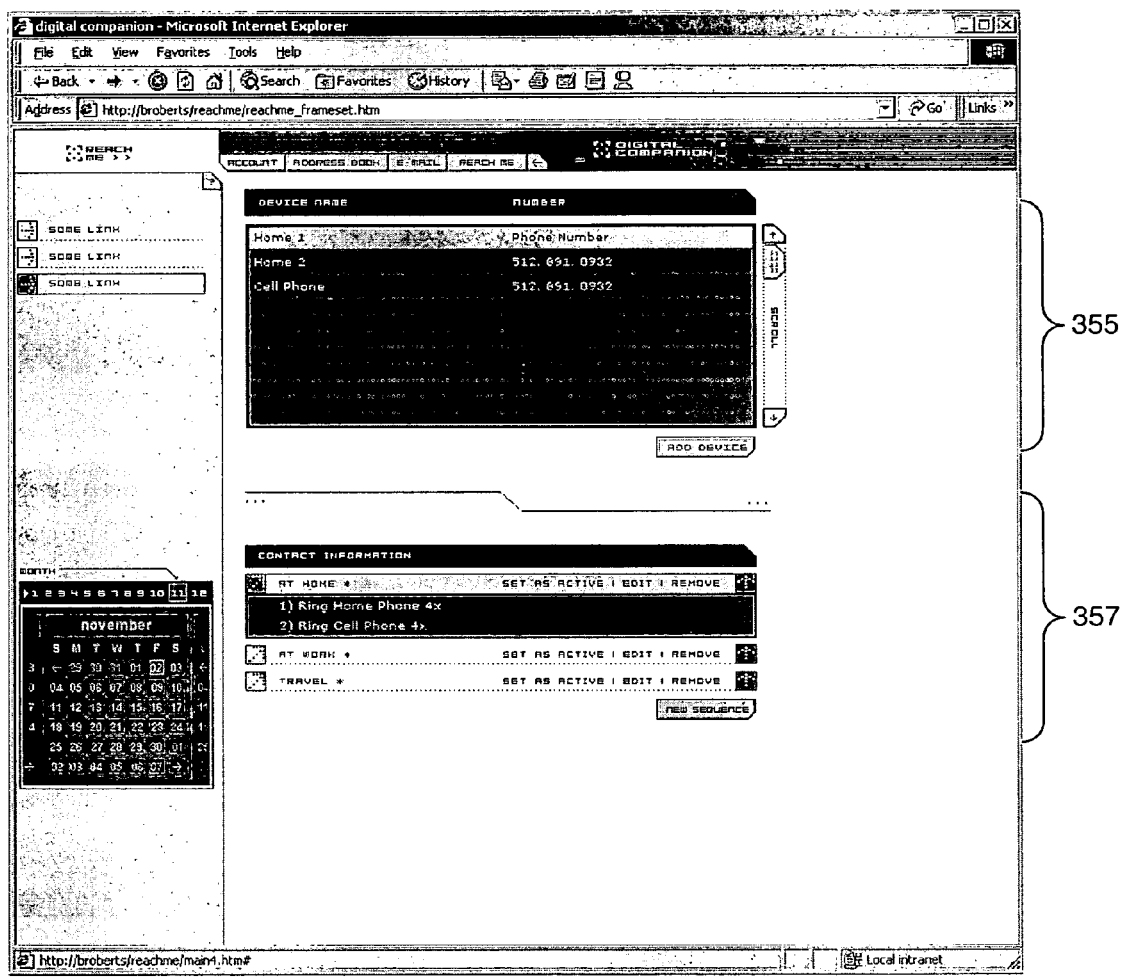

FIG. 3h shows a screen shot of a message center panel having a message summary list portion 350 that lists a summary of messages received. The screen shot also shows a message detail portion 352 that displays detail of a message. FIG. 3i shows a screen shot of a user interface having a device summary portion 355 that lists the devices in use by the user and a device detail portion 357 that allows the user to configure a particular device. For example, the user may configure the number of times to ring the "HOME 1" or "CELL PHONE" device.

Figure 3J:
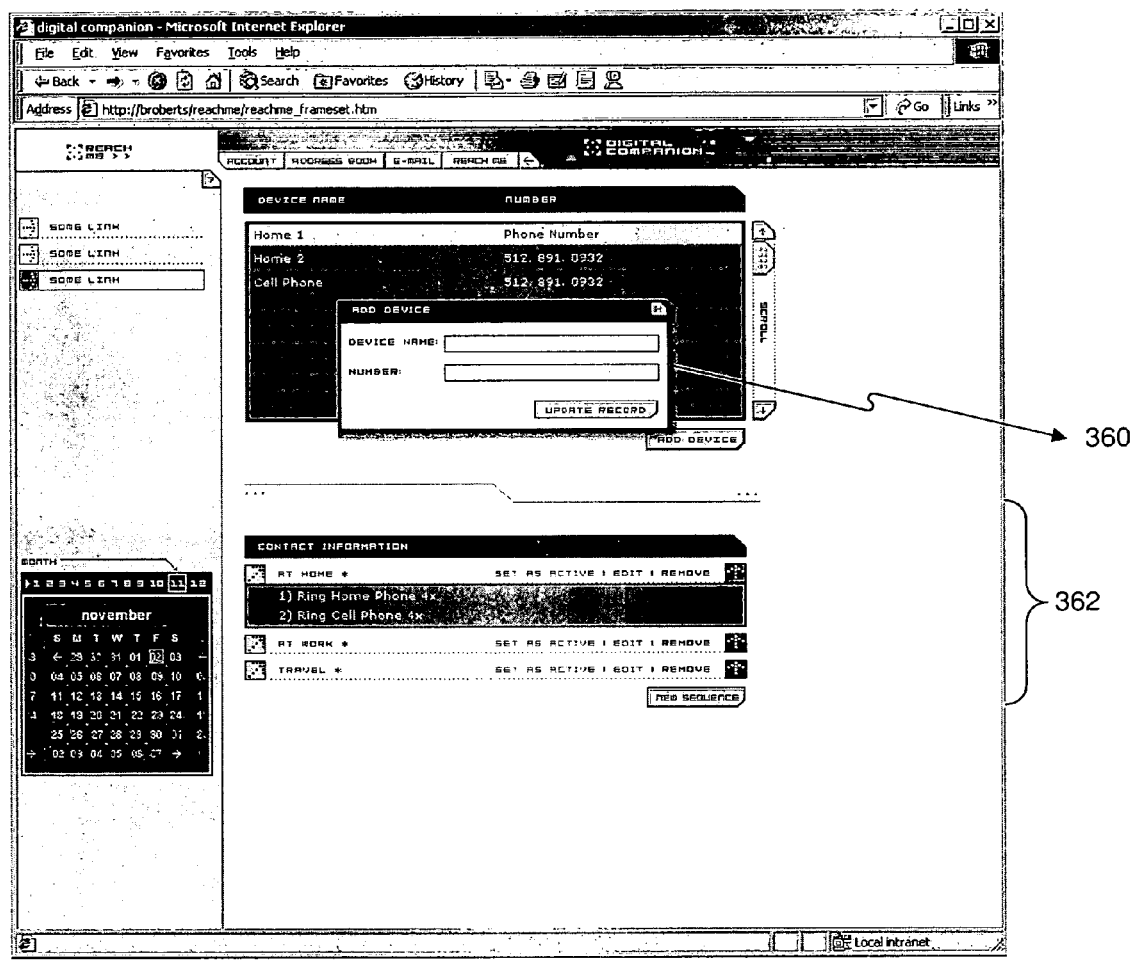
Figure 3K:
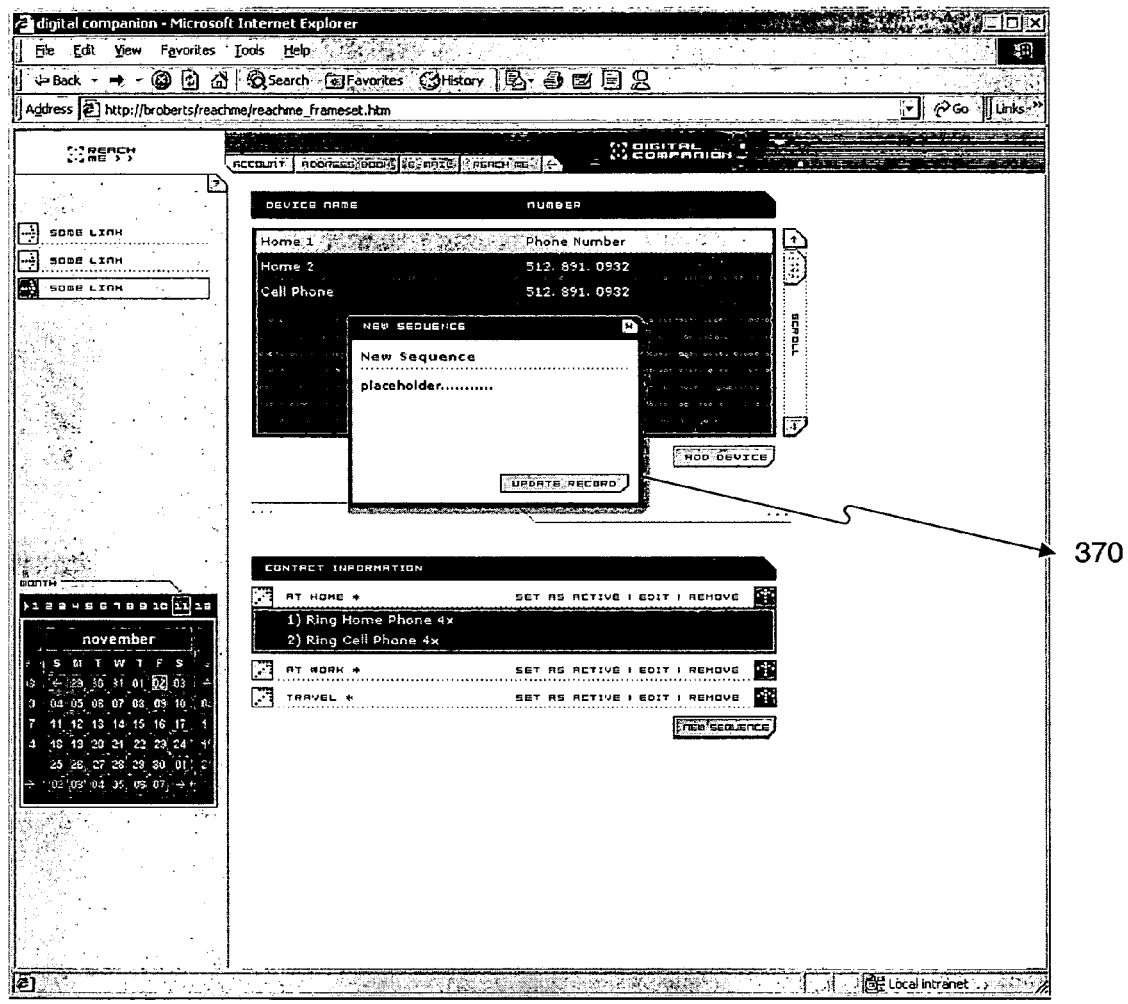
Figure 3I:
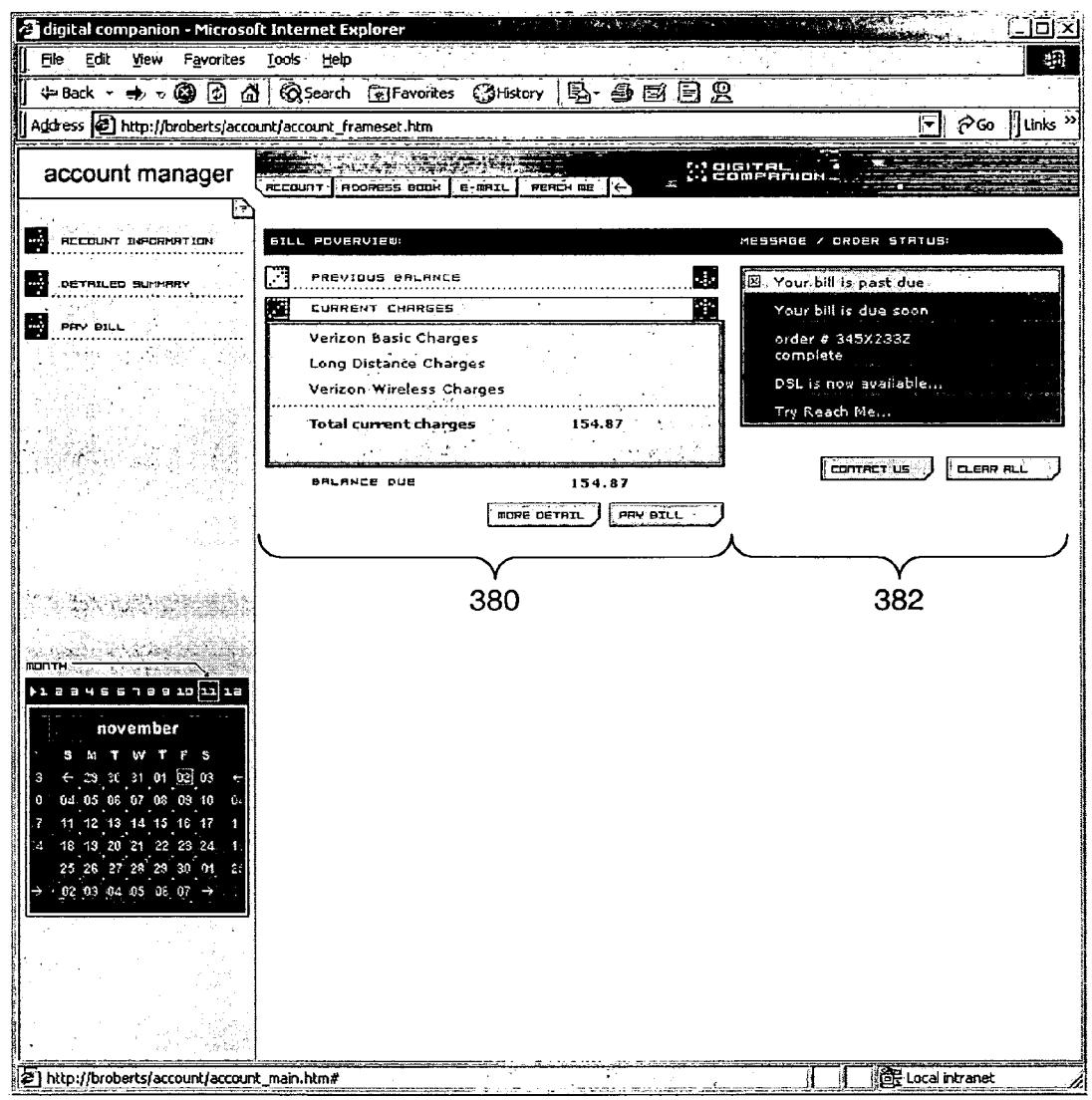

FIG. 3j shows a screen shot of the user interface of FIG. 3i having a pop-up window 360 for adding a device. The screen shot also shows a detail portion 362, which is similar to detail portion 357 of FIG. 3i. FIG. 3k shows a screen shot of the user interface of FIG. 3i having a pop-window 370 that provides an "UPDATE RECORD" option for a user to modify the sequence of devices being called.

FIG. 3l shows a screen shot of a user interface for account management having an overview portion 380 allowing a user access to summary information regarding a users account. For example, overview portion 380 allows a user to access "PREVIOUS BALANCE", "CURRENT CHARGES", "BASIC CHARGES", "LONG DISTANCE CHARGES", and "WIRELESS CHARGES" summary information. The screen shot also shows a message portion 382 which displays messages regarding the user's account. For example, a message such as "Your bill is past due" can be displayed in message portion 382.

Figure 3M:
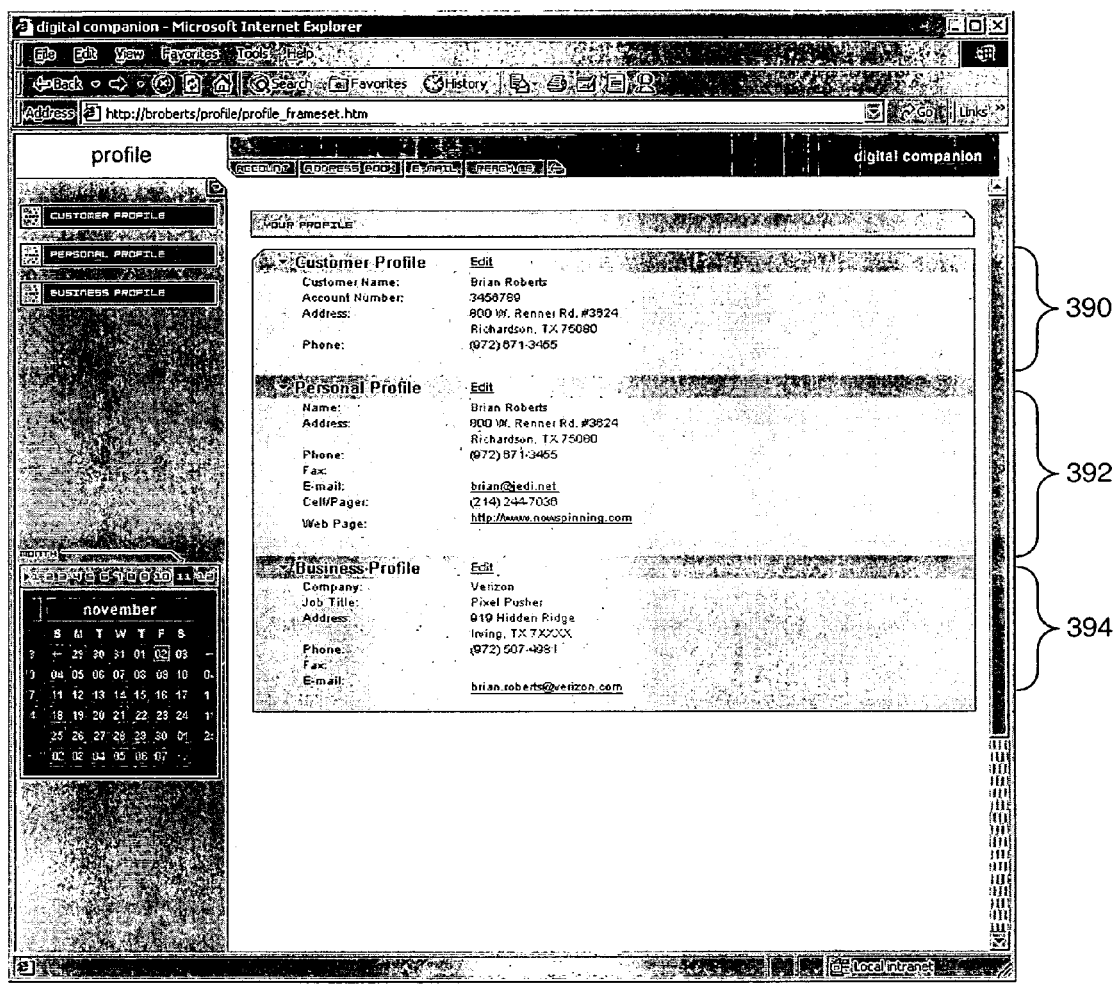

FIG. 3m shows a screen shot of a user interface for profile management having a customer profile portion 390, which displays a customer's profile. The customer's profile may include information such as "Customer Name:", "Account Number:", "Address" and "Phone:" information. The screen shot also shows a personal profile portion 392 that displays a user's personal profile. The personal profile may include "Name:", "Address", etc. information. The screen shot also shows a business profile portion 394 that displays a business profile. The business profile may include information such as "Company", "Job Title:" etc. information. These profiles can be kept confidential and updated to include any other type of profile information.

Figure 4:
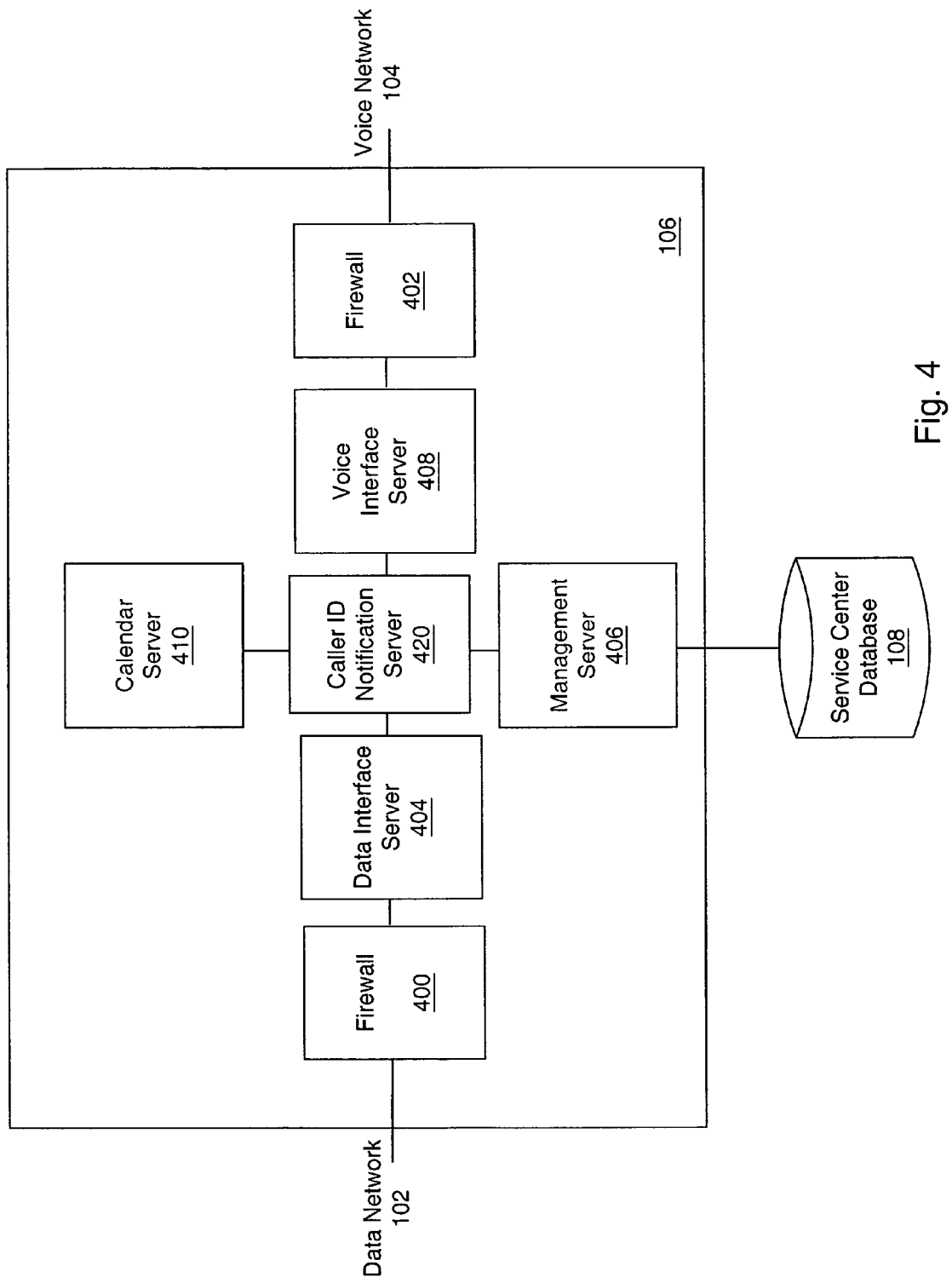
FIG. 4 is a block diagram of a service center, in accordance with methods and apparatus consistent with the principles of the present invention.

FIG. 4 is a block diagram of a service center, in accordance with methods and apparatus consistent with the principles of the present invention. Service center 106 is a gateway device, connecting voice network 104 to data network 102. As shown, service center 106 includes firewalls 400 and 402, a data interface server 404, a management server 406, a voice interface server 408, a calendar server 410, and a caller ID notification server 420.

Firewalls 400 and 402 provide security services for communications between service center 106 and data network 102, and between service center 106 and voice network 104, respectively. For example, firewalls 400 and 402 may restrict communications between data terminal 112 and one or more servers within service center 106. Any security policy may be implemented in firewalls 400 and 402 consistent with the principles of the present invention. Firewalls 400 and 402 may be implemented using a combination of known hardware and software, such as the Raptor Firewall provided by the Axent Corporation. Furthermore, firewalls 400 and 402 may be implemented as separate machines within service center 106, or implemented on one or more machines external to service center 106.

Data interface server 404 provides interface services between service center 106 and data terminal 112. For example, data interface server 404 may exchange TCP/IP communications, such as IM communications or XML information which include call forwarding patterns from user 110. Data interface server 404 may also interface proxy 124 to indirectly exchange communications with data terminal 112.

Management server 406 controls operation of service center 106 and provides access services to service center database 108. For example, management server 406 may store information, such as call forwarding patterns, received from data interface server 404 into service center database 108. Management server 406 may also service queries to service center database 108, for example, from data interface server 404 or voice interface server 408.

Voice interface server 408 provides interface services between service center 106 and voice network 104. For example, voice interface server 408 may exchange information, such as call forwarding patterns, between service center database 108 and voice network 104. Voice interface server 408 may provide the information to voice network 104 using one or more protocols. For example, voice interface server 408 may use TCP/IP, or the Signaling System 7 ("SS7") protocol.

Caller ID notification server 420 monitors voice network 104 for incoming caller ID messages to user 110. Caller ID notification server 420 determines where to forward the caller ID information based on service center database 108.

SS7 is a telecommunications protocol defined by the International Telecommunication Union ("ITU"). SS7 is an "out-of-band" signaling protocol using a system of nodes called Service Switching Points ("SSP"), Signal Transfer Points ("STP"), and Service Control Points ("SCP"). "Out-of-band signaling" is signaling that does not take place over the same path between switching elements as the connection, and instead uses separate digital channels between SS7 nodes. SS7 allows voice network 104 to provide enhanced functions, such as call forwarding; caller-ID; three-way calling; wireless services such as roaming and mobile subscriber authentication; local number portability; and toll-free/toll services.

Calendar server 410 provides services to calendar application 220 on data terminal 112. For example, calendar server 410 may provide email services, directory services, and calendar information, such as schedule information, to data terminal 112. Calendar server 410 may operate in conjunction with data interface server 404 to exchange, for example, call forwarding patterns with data terminal 112.

Although FIG. 4 shows separate servers within service center 106, service center 106 may be implemented using any combination of hardware and software. For example, service center 106 may implement data interface server 404, management server 406, voice interface server 408, calendar server 410, and caller ID notification server 420 as software applications installed on a single machine. In addition, service center 106 may access one or more servers remotely across a network.

FIG. 5 is a caller ID notification data structure, in accordance with methods and apparatus consistent with the principles of the present invention. Caller ID notification data structure table 500 illustrates the type of information that is available to a user when a caller ID is received. Each line of caller ID notification data structure table represents a caller ID notification event. Each caller ID notification event includes a time 520, a date 522, and caller ID 524. The caller ID is information stored on the source of a call.

Figure 6:
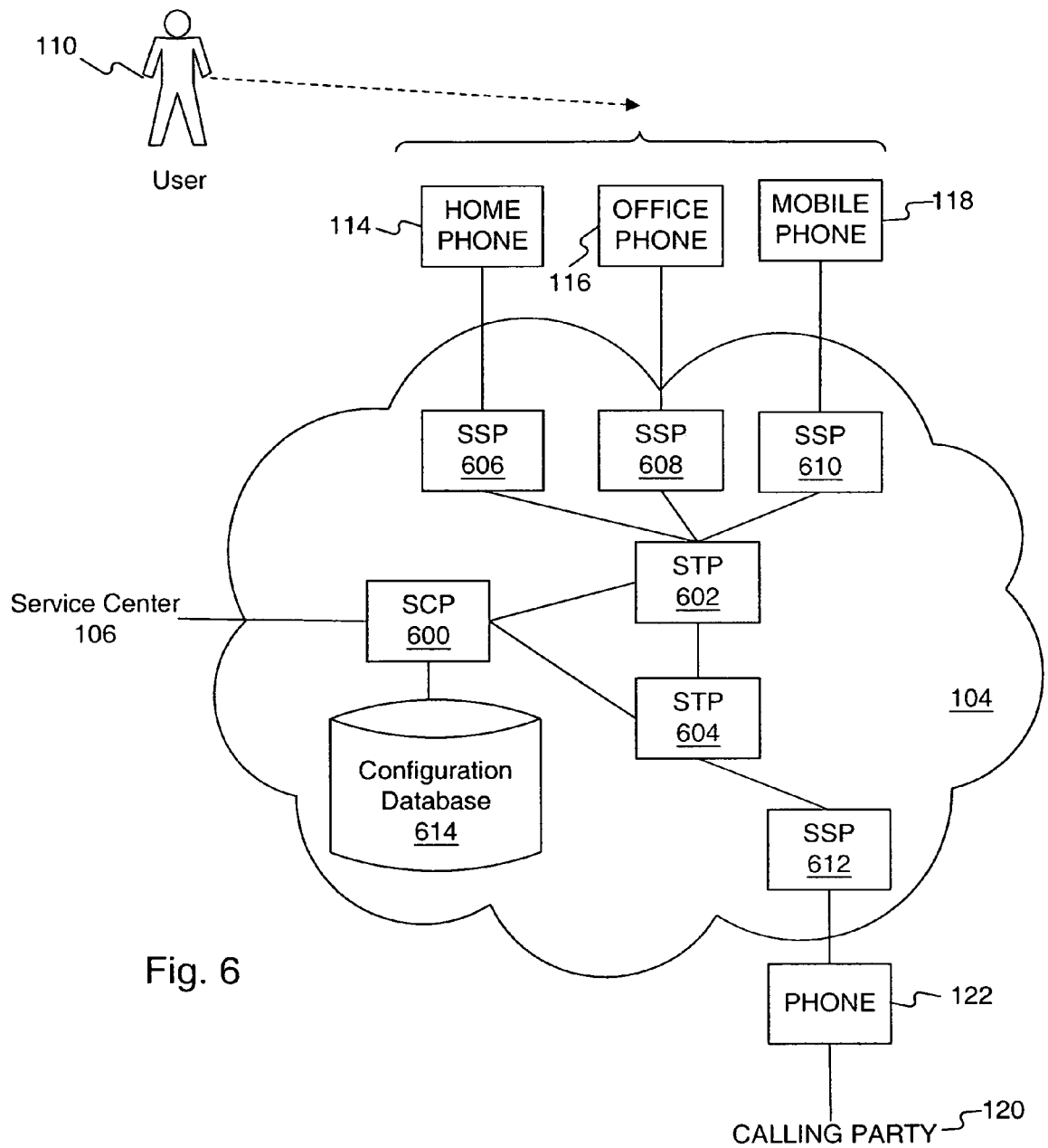
FIG. 6 is a block diagram of a voice network, in accordance with methods and apparatus consistent with the principles of the present invention.

FIG. 6 is a block diagram of a voice network, in accordance with methods and apparatus consistent with the principles of the present invention. As shown, voice network 104 includes a service control point ("SCP") 600, service transfer points ("STP") 602 and 604, service switching points ("SSP") 606, 608, 610, and 612, and a configuration database 614.

Voice network 104 may be implemented using the PSTN and SS7 as a signaling protocol. As noted above, the SS7 protocols allows voice network 104 to provide features, such as call forwarding; caller-ID; three-way calling; wireless services such as roaming and mobile subscriber authentication; local number portability; and toll-free/toll services. The SS7 protocol provides various types of messages to support the features of voice network 104. For example, these SS7 messages may include Transaction Capabilities Applications Part ("TCAP") messages to support event "triggers," and queries and responses between SCP 600 and SSPs 606, 608, 610, and 612.

SCP 600 provides interface services into configuration database 614 related to processing of calls within voice network 104, and interface services into voice interface server 408. SCP 600 provides translation and routing services of SS7 messages to support the features of voice network 104, such as call forwarding. In addition, SCP 600 may exchange information with voice interface server 408 in service center 106 using TCP/IP or SS7. For example, SCP 600 may receive configuration information from voice interface terminal 408 which requests one or more call forwarding patterns in voice network 104. SCP 600 may then configure the call forwarding patterns in voice network 104 using one or more SS7 messages, such as TOAP messages, to set triggers in SSPs 606, 608, 610, and 612.

SCP 600 may be implemented using a combination of known hardware and software. Although SCP 600 is shown with a direct connection to service center 106, any number of network elements including routers, switches, hubs, etc. may be used to connect SCP 600 and service center 106.

STPs 602 and 604 relay SS7 messages within voice network 104. For example, STPs 602 and 604 may route SS7 messages between SSPs 606, 608, 610, and 612. STPs 602 and 604 may be Integrated as adjunct to an SSP, e.g., SSPs 606, 608, 610, and 612, or may be implemented as a separate machine. In addition, STPs 602 and 604 may provide security functions, such as security checks on incoming/outgoing SS7 messages. STPs 602 and 604 may also provide other functions, such as acquisition and storage of traffic/usage statistics. STPs 602 and 604 may be implemented using known hardware and software from manufacturers such as NORTEL™ and LUCENT Technologies™.

SSPs 606, 608, 610, and 612 provide an interface between voice network 104 and phones 114, 116, 118, and 122, respectively, to setup, manage, and release telephone calls within voice network 104. SSPs 606, 608, 610, and 612 may be implemented as a voice switch, an SS7 switch, or a computer connected to a switch. SSPs 606, 608, 610, and 612 exchange SS7 signal units to support a telephone call between calling party 120 and user 110. For example, SSPs 606, 608, 610, and 612 may exchange SS7 messages, such as TCAP messages, within message signal units ("MSU") to control calls, perform database queries to configuration database 614, and provide maintenance information.

Configuration database 614 comprises one or more known databases to support the features of voice network 104. For example, configuration database 614 may include a call management service database; a line information database (LIDB); a business services database; a home location register; and a visitor location register.

Figure 7:
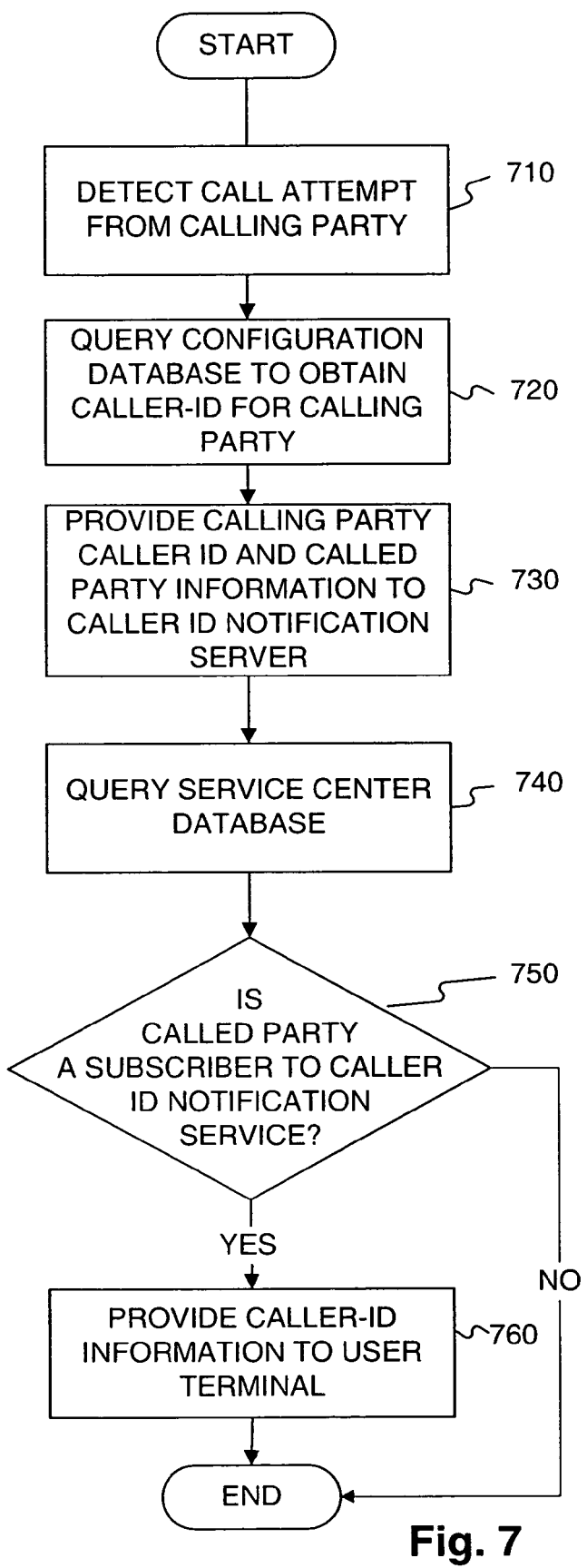
FIG. 7 is a flow diagram illustrating a method of supplying Caller-ID information over a data network consistent with the principles of the present invention.

FIG. 7 is a flow diagram illustrating a method of supplying Caller-ID information over a data network consistent with the present invention. A call attempt from a calling party 120 is detected by a switch (step 710). When calling party 120 attempts to make a call to called party, e.g. user 110, by dialing the phone number of phone 114, SSP 612 detects the call attempt and generates signaling information. The signaling information contains an identifier of called party 110, e.g., the called party's telephone number, and an identifier of calling party 120.

SSP 612 sends the signaling information, in the form of an alert, to SCP 600. Upon receiving the alert, SCP 600 queries configuration database 614 to determine the calling party's Caller-ID information (step 720). From the query of configuration database 614, SCP 600 receives the Caller-ID information of calling party 120.

SCP 600 then provides the calling party Caller-ID information and called party identifier to caller ID notification server 420 in service center 106 (step 730). In response to receiving information from SCP 600, caller ID notification server 420 queries service center database 108 based upon the called party identifier (step 740). From querying service center database 108, caller ID notification server 420 determines whether the called party identifier corresponds to a subscriber, e.g., called party 110 (step 750).

If the called party identifier corresponds to called party 110, then caller ID notification server 420 may determine where to forward the Caller-ID information, e.g., to user terminal 112 (step 760). For example, caller ID notification server 420 may transmit the Caller-ID information to data interface server 404 using IM. Subsequently, data interface server 404 forwards the Caller-ID information within an IM message to user terminal 112 where it may be displayed or otherwise presented to called party 110. Accordingly, user 110 may receive Caller-ID information independently of phone 114 via data network 102 and user terminal 112.

If the called party identifier does not correspond to a subscriber within service center database 108, then the process may end. Alternatively, if user 110 was not currently online, then caller ID notification server 420 may archive the Caller-ID information within service center database 108 for later delivery.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for supplying calling party information to a called party via a network comprising a telephone network, a data network, and at least one gateway device connected to both the telephone network and the data network, comprising:

receiving by the gateway device, via the telephone network, signaling information representing a telephone call from the calling party to a telephone device associated with the called party, the signaling information comprising called party information;

obtaining the calling party information based on the signaling information;

determining whether a second device associated with the called party and separate from the telephone device is connected to the data network;

storing the calling party information when the second device is not connected to the data network; and providing the stored calling party information to the second device associated with the called party from the gateway device via the data network when the second device becomes connected to the data network.

2. The method of claim 1, wherein providing the calling party information comprises displaying an instant message on a display device.

3. The method of claim 1, wherein the telephone network is a public services telephone network.

4. The method of claim 1, wherein the telephone network is a wireless telephone network.

5. The method of claim 1, wherein providing the calling party information comprises displaying the calling party information on a display device associated with the called party.

6. The method of claim 1, wherein obtaining the calling party information comprises connecting to a switch in the telephone network based on the called party information and obtaining calling party information from the switch.

7. The method of claim 6, wherein providing the calling party information comprises providing the calling party information to a server in the data network associated with the called party.

8. The method of claim 1, wherein providing the calling party information comprises providing the calling party information using an instant messaging server.

9. The method of claim 8, further comprising using the instant messaging server to authenticate the called party.

10. The method of claim 1, wherein the second device is a data terminal.

11. An apparatus comprising:
a telephone network;
a switch connected to the telephone network;
a data network;
a data controller connected to the data network;
a gateway connected to both the switch and the data controller, the gateway being capable of (1) receiving, via the switch, signaling information representing a telephone call from a calling party to a telephone device associated with a called party, the signaling information comprising called party information; (2) obtaining calling party information based on the signaling information; (3) determining whether a second device associated with the called party and separate from the telephone device is connected to the data network; (4) storing the calling party information when the second device is not connected to the data network; and (5) providing the stored calling party information to the second device associated with the called party via the data controller when the second device becomes connected to the data network.

12. The apparatus of claim 11, wherein the gateway is further capable of providing instruction for displaying an instant message on a display device associated with the called party.

13. The apparatus of claim 11, wherein the gateway is capable of obtaining the calling party information via the switch.

14. The apparatus of claim 11, wherein the gateway is further capable of displaying the calling party information on a display device associated with the called party.

15. The apparatus of claim 14, wherein the gateway is further capable of providing the calling party information to a server in the data network associated with the called party.

16. The apparatus of claim 14, wherein the gateway is further capable of providing instructions to an instant messaging server for providing the calling party information.

17. The apparatus of claim 16, further capable of providing instructions to the instant messaging server for authenticating the called party.

18. The apparatus of claim 11, wherein the second device is a data terminal.

19. A system comprising:
a telephone network for receiving a caller connection request;
a data network for providing calling party information;
a gateway device, connecting said telephone network to said data network, for: (1) receiving, via the telephone, network signaling information representing a telephone call from a calling party to a telephone device associated with a called party, the signaling information comprising called party information; (2) obtaining the calling party information based on the signaling information; (3) determining whether a second device associated with the called party and separate from the telephone device is connected to the data network; (4) storing the calling party information when the second device is not connected to the data network, and (5) providing the stored calling party information to the second device associated with the called party via the data network when the second device becomes connected to the data network.

20. The system of claim 19, wherein the gateway device comprises means for providing instructions that cause a display device associated with the called party to display an instant message.

21. The system of claim 19, wherein the gateway device comprises a means for connecting to a switch in the telephone network based on the called party information and obtaining calling party information from the switch.

22. The system of claim 19, wherein the data network comprises a means for causing a display device associated with the called party to display the calling party information.

23. The system of claim 22, wherein the gateway device network comprises means for providing the calling party information to a server in the data network associated with the called party.

24. The system of claim 22, wherein the gateway device comprises means for providing the calling party information using an instant messaging server.

25. The system of claim 23, further comprising means for using the instant messaging server to authenticate the called party.

26. The system of claim 19, wherein the second device is a data terminal.

* * * * *